(12) United States Patent
Maeda et al.

(10) Patent No.: US 7,930,501 B2
(45) Date of Patent: Apr. 19, 2011

(54) MEMORY CARD, ACCESS DEVICE, AND PROCESSING METHOD OF MEMORY CARD

(75) Inventors: Takuji Maeda, Osaka (JP); Hirokazu So, Osaka (JP); Shinji Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 710 days.

(21) Appl. No.: 11/568,157

(22) PCT Filed: Apr. 18, 2005

(86) PCT No.: PCT/JP2005/007386
§ 371 (c)(1),
(2), (4) Date: Jan. 5, 2007

(87) PCT Pub. No.: WO2005/104021
PCT Pub. Date: Nov. 3, 2005

(65) Prior Publication Data
US 2007/0255901 A1   Nov. 1, 2007

(30) Foreign Application Priority Data
Apr. 23, 2004   (JP) .............................. 2004/127813

(51) Int. Cl.
G06F 12/00 (2006.01)
G06F 13/00 (2006.01)
G06F 13/28 (2006.01)

(52) U.S. Cl. .......................... 711/163; 711/103; 711/173

(58) Field of Classification Search .................. 711/163, 711/103, 173
See application file for complete search history.

(56) References Cited

U.S. PATENT DOCUMENTS

| 5,434,618 | A | * | 7/1995 | Hayashi et al. ............ 348/231.2 |
| 6,609,187 | B1 | | 8/2003 | Merrell et al. |
| 7,143,237 | B2 | * | 11/2006 | Suda ............................. 711/115 |
| 7,197,613 | B2 | * | 3/2007 | Shibuya et al. ............... 711/156 |
| 2004/0107316 | A1 | | 6/2004 | Moro |

(Continued)

FOREIGN PATENT DOCUMENTS
JP   2002-342131   11/2002
(Continued)

OTHER PUBLICATIONS
English language Abstract of JP 2004-086505.
(Continued)

Primary Examiner — Kevin L Ellis
Assistant Examiner — Ryan Bertram
(74) Attorney, Agent, or Firm — Greenblum & Bernstein, P.L.C.

(57) ABSTRACT

Each of memory cards can have a different type and can be in a plurality of statuses. The memory cards are managed by a file system and data is read/written from/to the memory cards via an access device. Each of the memory cards has a recording area in which data is recorded and managed by an independent file system, a state storage section for storing state assigned to each of combinations of the memory card type and status and being capable of uniquely identifying the combination, and card information storage sections the number of which is identical to the number of states the memory card can have, and which store physical characteristics concerning the recording area. The access device acquires from the memory card a state enable uniquely identifying the memory card type and status. According to the state acquired, the access device identifies the type and status of the memory card and executes processing in accordance with the memory card state.

17 Claims, 19 Drawing Sheets

U.S. PATENT DOCUMENTS

| | | |
|---|---|---|
| 2004/0123059 A1 | 6/2004 | Suda |
| 2005/0216684 A1 | 9/2005 | So et al. |
| 2005/0231765 A1 | 10/2005 | So et al. |
| 2006/0050622 A1 | 3/2006 | So et al. |
| 2006/0097061 A1 | 5/2006 | Moro |
| 2006/0195672 A1 | 8/2006 | Inoue et al. |

FOREIGN PATENT DOCUMENTS

| | | |
|---|---|---|
| JP | 2004-086503 | 3/2004 |
| JP | 2004-086505 | 3/2004 |

OTHER PUBLICATIONS

English language Abstract of JP 2002-342131.

ISO/IEC 9293, "Information Technology—Volume and file structure of disk cartridge for information" (1994).

Optical Storage Technology Association (OSTA), "Universal Disk Format Specification Revision 1.50)," (1997).

English language Abstract of JP 2004-086503.

U.S. Appl. No. 10/578,373 to So et al., which was filed on May 5, 2006.

U.S. Appl. No. 10/578,372 to Maeda et al, which was filed on May 5, 2006.

U.S. Appl. No. 10/596,155 to So et al., which was filed on Jun. 1, 2006.

U.S. Appl. No. 11/571,592 to Toyama et al., which was filed on Jan. 3, 2007.

U.S. Appl. No. 11/571,597 to Toyama et al., which was filed on Jan. 3, 2007.

\* cited by examiner

Fig. 11

STATE TABLE

| STATE | CARD TYPE | ACCESS REGION | CAPACITY | NUMBER OF STATES OF CARD | NECESSITY/UNNECESSITY OF FORMAT ON CHANGEOVER OF STATE | FS TYPE |
|---|---|---|---|---|---|---|
| NOTHING | MEMORY CARD A | WHOLE RECORDING REGION | <=2GB | 1 | — | FAT16 |
| 1 | MEMORY CARD B | WHOLE RECORDING REGION | >2GB | 1 | — | FAT32 |
| 2 | MEMORY CARD C | PART OF RECORDING REGION | 2GB | 2 | NECESSITY | FAT16 |
| 3 | MEMORY CARD C | WHOLE RECORDING REGION | >2GB | 2 | NECESSITY | FAT32 |
| 4 | MEMORY CARD D | RECORDING REGION 1 | 2GB | 2 | UNNECESSITY | FAT16 |
| 5 | MEMORY CARD D | RECORDING REGION 2 | >2GB | 2 | UNNECESSITY | FAT32 |
| 6 | MEMORY CARD E | RECORDING REGION 1 | 2GB | 3 | UNNECESSITY (FROM STATE 7), NECESSITY (FROM STATE 8) | FAT16 |
| 7 | MEMORY CARD E | RECORDING REGION 2 | >2GB | 3 | UNNECESSITY (FROM STATE 6), NECESSITY (FROM STATE 8) | FAT32 |
| 8 | MEMORY CARD E | WHOLE RECORDING REGION (RECORDING REGION 1 + RECORDING REGION 2) | >2GB | 3 | NECESSITY | FAT32 |

Fig. 15

PERFORMANCE INFORMATION

| INPUT CLOCK | PROCESS | | |
|---|---|---|---|
| | READ | WRITE | ERASE |
| 12.5MHz | Table 1-A | Table 1-B | Table 1-C |
| 25MHz | Table 2-A | Table 2-B | Table 2-C |
| 50MHz | Table 3-A | Table 3-B | Table 3-C |

(Table2-B) TRANSFER RATE (INPUT CLOCK=25MHz, PROCESS=WRITE)

| | | STANDARD VALUE | | WORST VALUE | |
|---|---|---|---|---|---|
| | | SEQUENTIAL | RANDOM | SEQUENTIAL | RANDOM |
| ACCESS UNIT | 512Bytes | 0.03MB/sec | 0.02MB/sec | 0.02MB/sec | 0.01MB/sec |
| | 16KB | 6MB/sec | 0.7MB/sec | 3MB/sec | 0.3MB/sec |
| | 128KB | 10MB/sec | 8MB/sec | 5MB/sec | 4MB/sec |
| | 256KB | 10MB/sec | 8MB/sec | 5MB/sec | 4MB/sec |
| | 1MB | 10MB/sec | 8MB/sec | 5MB/sec | 4MB/sec |

RECORDING MODE
PLEASE SELECT RECORDING MODE, THEN PRESS "ENTER".

☐ ECONOMY
↳ NORMAL        (CURRENT STATUS)
☒ FINE          (NOT SUPPORTED)
☒ SUPER FINE    (NOT SUPPORTED)

[ ENTER ]    [ CANCEL ]

(b)

RECORDING MODE
PLEASE SELECT RECORDING MODE. THEN PRESS "ENTER".

☐ ECONOMY       (CURRENT STATUS)
☐ NORMAL
☐ FINE
↳ SUPER FINE

[ ENTER ]    [ CANCEL ]

MEMORY CARD, ACCESS DEVICE, AND PROCESSING METHOD OF MEMORY CARD

TECHNICAL FIELD

The invention relates to a memory card for storing plural types or states. The invention also relates to an access device for accessing plural memory cards different in type or a memory card having plural states, and a processing method of a memory card.

BACKGROUND ART

Recording media for recording digital data such as music contents and video data include magnetic disk, optical disk, magneto-optical disk, and many others. A memory card is one of such recording media, using mainly a semiconductor memory such as flash ROM as recording element, and is hence reduced in the size. Thus it is widely and rapidly used in digital still camera, portable cellular terminal, and other small and portable appliances.

Data stored in the memory card is managed by a file system so that the user can handle the stored data easily as a file. Existing file systems include FAT file system (see non-patent document 1), UDF (Universal Disk Format) file system (see non-patent document 2), NTFS (New Technology File System), etc. The memory cards which store data managed by any one of these file systems can share files between devices interpreting the same file system, and hence data can be exchanged between the devices.

Recently, as the memory cards are distributed widely, application range are spreading from the conventional use as a recording medium for music contents and still image contents, to recording of moving image contents with large data size and high picture quality. To meet such needs, the capacity of the memory card is increasing double by double, year after year. However, there is a limit in hit length of field which expresses the card capacity and scored in internal register of the memory card, or bit width of an argument for specifying internal address of the memory card, and to be applicable to large capacity of the memory card, it is needed to extend the conventional register composition or commands. Similarly, the file system also has an upper limit of manageable region, and it is needed to use a new file system for managing the region of the memory card with large capacity exceeding the upper limit capacity that can be managed by an existing file system.

In prior art, to solve such problems, the following method has been proposed to achieve a large capacity memory card. According to the method, the recording region of the memory card is divided into plural portions, and each region is used while changed over so that the memory capacity can be enlarged without exceeding the physical upper limit of the capacity of the register or command, or upper limit of file system (see, for example, patent document 1).

Patent document 1: JP-A-2004-86503
Non patent document 1: ISO/IEC 9293, "Information Technology—Volume and file structure of disk cartridges for information," 1994
Non-patent document 2: OSTA Universal Disk Format Specification Revision 1.50, 1997

DISCLOSURE OF INVENTION

Problems to be Solved by the Invention

In the conventional method, however, since the memory card is divided into plural regions, and the individual regions are managed by independent file system, the entire region of the memory card cannot be handled by one region, and the maximum size off files to be created and the directory composition are limited. To solve these problems, it may be considered to vary the capacity of memory card. That is, either the upper limit capacity accessible by the conventional access device or the maximum capacity of the memory card is set in the memory card, and the memory card can be used in the capacity according to the application of the user of the memory card.

There are plural types of means for increasing the memory card capacity, and in future the market may be confused by plural types of memory cards created by different realizing means.

In such a case, the access device must identify the type and status of the memory card, whether the regions can be changed over or not, whether the capacity can be changed over or not, or what is the present status of card. In the conventional access device, types of memory cards cannot be identified, and hence the access device cannot present appropriate process suited to the type and status of each memory card.

In the light of such problems, it is hence an object of the invention to present a memory card identified by type and status, an access device processing according to each memory card by judging the type and status of memory cards, and a processing method of a memory card.

Solving Means

A memory card according to the invention is a memory card in which data is managed with a file system and can be read/written by an access device. The memory card includes: one or more recording regions that records data and are managed by an independent file system; a state storage section that stores state which is assigned to each of combinations of type and status of the memory card, and enables uniquely identifying of current type and current status of the memory card from possible combinations in the memory card; and card information storage sections that are provided as many as states provided by the memory card, and store physical characteristics about at least capacity of the recording regions.

In a first type of the memory card, the number of the recording regions and the number of the card information storage sections may be respectively one. Access to whole region of the recording region may be permitted when accessed from an access device capable of acquiring and interpreting the state stored in the state storage section. Access to the recording region may be prohibited when accessed from an access device incapable of acquiring and interpreting the state stored in the state storage section.

In a second type of the memory card, the number of the recording regions may be one. The card information storage section may include a first card information storage section and a second card information storage section. The memory card can be in first state or second state. When the memory card is in first state, the first card information storage section may be made available to be referred to from the access device, thus permitting access to the recording region depending on the physical characteristics stored in the first card information storage section. When the memory card is in second state, the second card information storage section may be made available to be referred to from the access device, thus permitting access to the recording region depending on the physical characteristics stored in the second card information storage section.

In a third type of the memory card, the recording region may include a first recording region and a second recording region. The card information storage section may include a first card information storage section and a second card information storage section. The memory card can be in first state or second state. When the memory card is in first state, the first card information storage section may be made available to be referred to from the access device, thus permitting access to the first recording region depending on the physical characteristics stored in the first card information storage section. When the memory card is in second state, the second card information storage section may be made available to be referred to from the access device, thus permitting access to the second recording region depending on the physical characteristics stored an the second card information storage section.

In fourth type of the memory card, the recording region may include a first recording region and a second recording region. The card information storage section may include a first, second, and third card information storage sections. The state storage section can store three states. When the memory card is in first state, the first card information storage section may be made available to be referred to from the access device, thus permitting access to the first recording region depending on the physical characteristics stored in the first card information storage section. When the memory card is in second state, the second card information storage section may be made available to be referred to from the access device, thus permitting access to the second recording region depending on the physical characteristics stored in the second card information storage section. When the memory card is in third state, the third card information storage section is made available to be referred to from the access device, thus permitting access to the first and second recording regions depending on the physical characteristics stored in the third card information storage section.

Furthermore, performance information storage sections may be provided in the memory card, which stores performance information indicating access performance about transfer rate of the memory card, the performance information storage sections provided by the same number of state stored in the state storage section.

The state storage section may be a physical switch.

An access device according to the invention is a device for accessing a memory card, and includes: a card slot to be loaded with the memory card; an operation unit that receives an instruction from the user; a display unit that displays a list of status of the memory card or access device and of process to be specified by the user; a state judging unit that acquires, from the memory card, state which enables uniquely identifying of current type and current status of the memory card from possible combinations in the memory card, and judges the type and status of the memory card on the basis of the acquired state; a state dependent processing unit that refers to the judging result of the state judging unit, and executes the process depending en the state of the memory card; and a main processing unit that executes specified process including data reading and writing process on the memory card, according to the input from the operation unit.

A processing method according to the invention is a method of a memory card, and includes the steps of: initializing a memory card when a memory card is loaded in an access device; acquiring state which enables uniquely identifying of type and status of the memory card, from the memory card; judging whether user's request on the access device is a request dependent on the state or not; and executing a process depending on the state of the memory card to the memory card with reference to the acquired state, when user's request is judged to be dependent on the state based on the judging result.

EFFECTS

According to the invention, the memory card stores an identifier capable of identifying the type and status of memory card, and the access device acquires the identifier and changes the process depending on the type and status of the memory card. Hence an appropriate process depending on each memory card can be presented to the user.

BRIEF DESCRIPTION OF DRAWINGS

FIG. 11 is a diagram of an example of state list in embodiment 1 of the invention.

FIG. 15 is a diagram of an example of performance information in embodiment 2 of the invention.

FIG. 16 is a diagram of example of a recording mode setting process in embodiment 2 of the invention.

REFERENCE SIGNS

Figure 1:
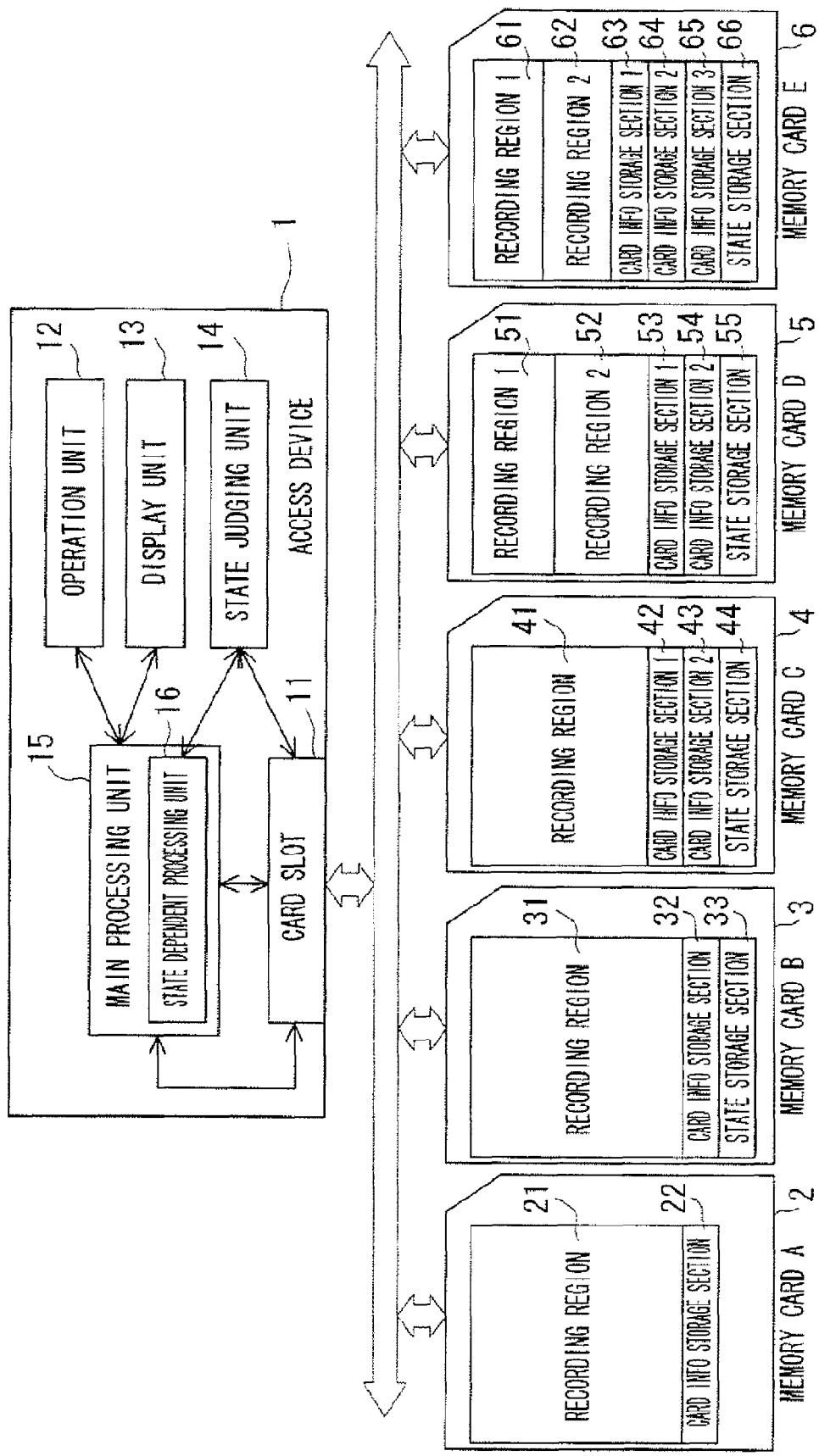
FIG. 1 is a diagram showing implementation of a memory card and an access device in embodiment 1 of the invention.

1 Access device
2, 3, 4, 5, 6 Memory card
11 Card slot
12 Operation unit
13 Display unit
14 State judging unit
15 Main processing unit
16 State dependent processing unit
21, 31, 41, 51, 52, 61, 62 Recording region 22, 32, 42, 43, 53, 54, 63, 64, 65 Card information storage section
33, 44, 55, 66 State storage section
34, 45, 46, 56, 57, 67, 68, 69 Performance information storage section
190 Physical switch

BEST MODE FOR CARRYING OUT THE INVENTION

A memory card, access device, and processing method of a memory card of the present invention are specifically described below with reference to the accompanying drawings.

Embodiment 1

FIG. 1 is a block diagram of a memory card and access device in embodiment 1 of the invention. The access device 1 includes a card slot 11 for loading a memory card, an operation unit 12 having, for example, buttons handled by which the user specifies the process to be executed by the access device 1, a display unit 13 for displaying a list of operation menu to be presented to the user or a list of files stored in the memory card, a state judging unit 14 for acquiring the state from the memory card and judging the type and status of the memory card, and a main processing unit 15 for executing various processes on the memory card depending on the input from the operation unit 12.

The main processing unit 15 includes a state dependent processing unit 16 for executing different processes in each state by referring to the state judging result of the state judging unit 14. The access device 1 of the invention has a feature in having the state judging unit 14 and state dependent processing unit 16 and judging the type and status (state) of the memory card to present appropriate process suited to each memory card to the user.

The access device 1 includes a digital still camera, portable cellular terminal, memory card movie player, audio player, PC (Personal Computer), PDA (Personal Digital Assistance), and other appliances having functions for accessing the memory card.
<Various Types of Memory Card>

The memory card is explained. As shown in FIG. 1, there are five types of memory cards, from type A to type E, and each one has a different characteristic. Outline of each memory card is explained. In the following explanation, the memory card of type X (X=A, B, C, D, E) is expressed as "memory card X".

The memory card A (2) is a conventional memory card not applicable to large capacity. The memory card A (2) includes card information storage section 22 for storing information showing the card capacity, minimum access unit, maximum number of input clocks, current value, and other physical characteristics of the memory card, and recording region 21 having a capacity less than the upper limit of capacity that can be accessed by the conventional access device.

The memory card B (3), memory card C (4), memory card D (5), memory card E (6) are next-generation memory cards applicable to large capacity. Each memory card includes one or more card information storage sections for expressing the size of region larger than the upper limit capacity accessible by the conventional access device, and one or more recording regions, and one or more of recording regions.

Further, each of next-generation memory cards B to E (3 to 6) includes state storage sections 33, 44, 55, and 66. The state storage sections 33, 44, 55, 66 store the state capable of identifying the type and status of the memory card, and are characteristic elements of the invention. The memory cards B to E (3 to 6) include card information storage sections 32, 42, . . . by the same number of states available in each card. The card information storage sections 32, 42, . . . store the information showing the card capacity, minimum access unit, maximum number of input clocks, current value, and other physical characteristics of the memory card according to each state.

Thus, the memory cards B to E have state storage sections 33, 44, 55, and 66. The access device 1 judges the type and status of the memory card using the state stored in the state storage sections 33, 44, 55, and 66 to change over the process to be executed depending on the state. Such combination of the memory card and access device can provide the user with appropriate process depending on the type and status of each memory card.

The memory cards C to E (4 to 6) store information specifying valid one of plural card information storage sections in a specified management information region (register or the like). The memory cards C to E (4 to 6) refer to the value of management information region, and can recognize valid one of plural card information storage sections. In the management information region, generally, various types of management information necessary for control of the memory card is stored.

Referring now to FIG. 2 to FIG. 9, the detail of memory cards 3 to 6 of types B to E is described. Memory card A (2) is a conventional memory card, and in the following explanation, the upper limit capacity accessible by conventional access device is expressed as 2 GB. This value is the upper limit capacity of FAT16 file system widely used in the present memory card.

Figure 2:
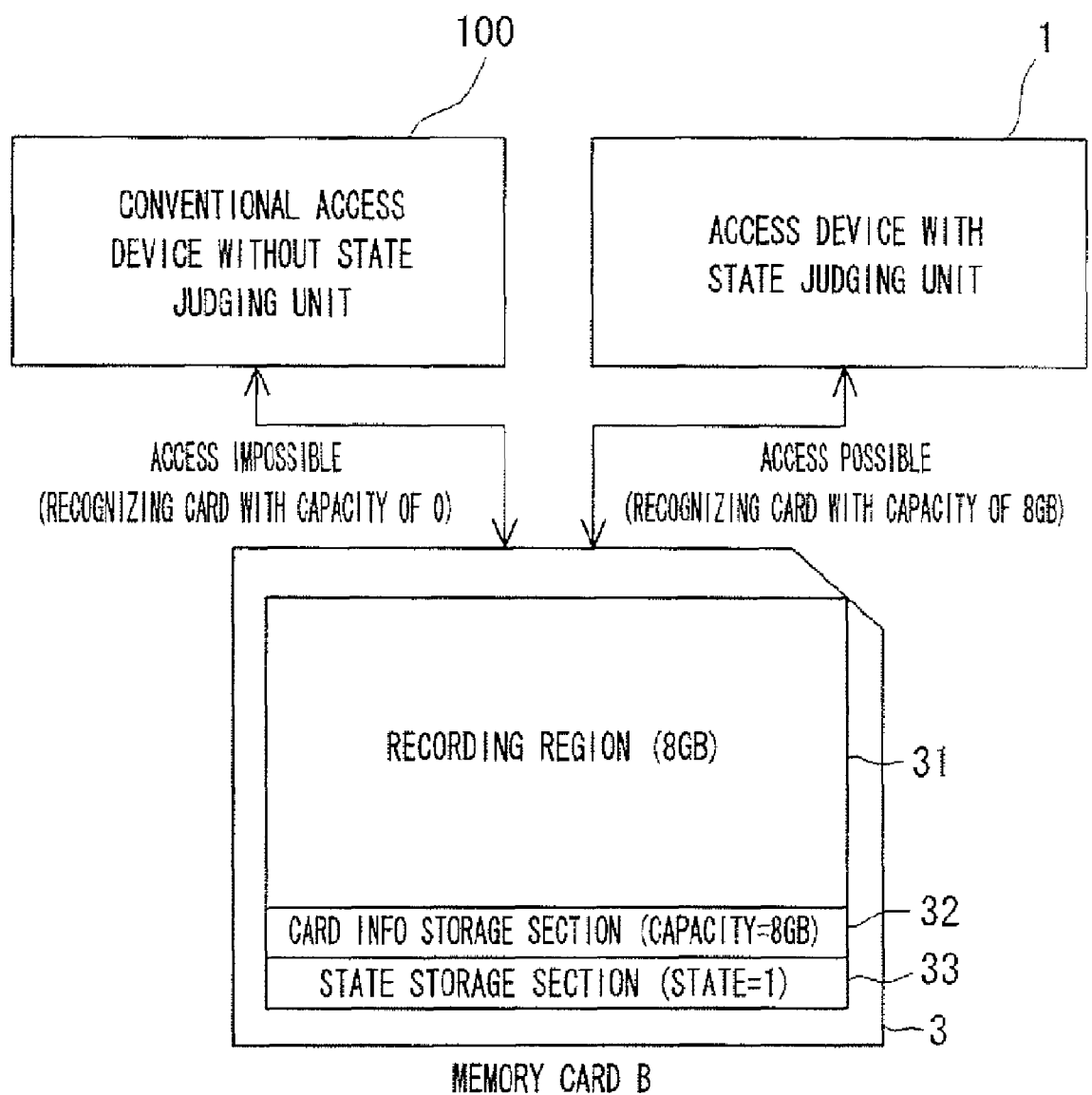
FIG. 2 is a diagram of an example of a memory card B (state "1") in embodiment 1 of the invention.

FIG. 2 is an explanatory diagram of the memory card B (3). The memory card B (3) is a next-generation memory card applicable to large capacity, and has a recording region 31 of 8 GB as large capacity region exceeding 2 GB. The memory card B (3) holds only one card information storage section 32 capable of expressing the size of recording region, and the card information storage section 32 stores the value of 8 GB as its capacity. When the memory card B (3) is used in the access device 1 of the invention, since the access device 1 is applicable to large capacity, the entire region of 8 GB is accessible. When the memory card B (3) is used in the conventional access device 100 not applicable to large capacity, it is recognized as a card of capacity 0, and no access is allowed. This is intended to prevent destruction of data stored in the memory card B (3) due to malfunction of the conventional access device 100. The memory card B (3) having such feature has only one status, and "1" is stored in the state storage section 33 as identifier showing the status.

Figure 3:
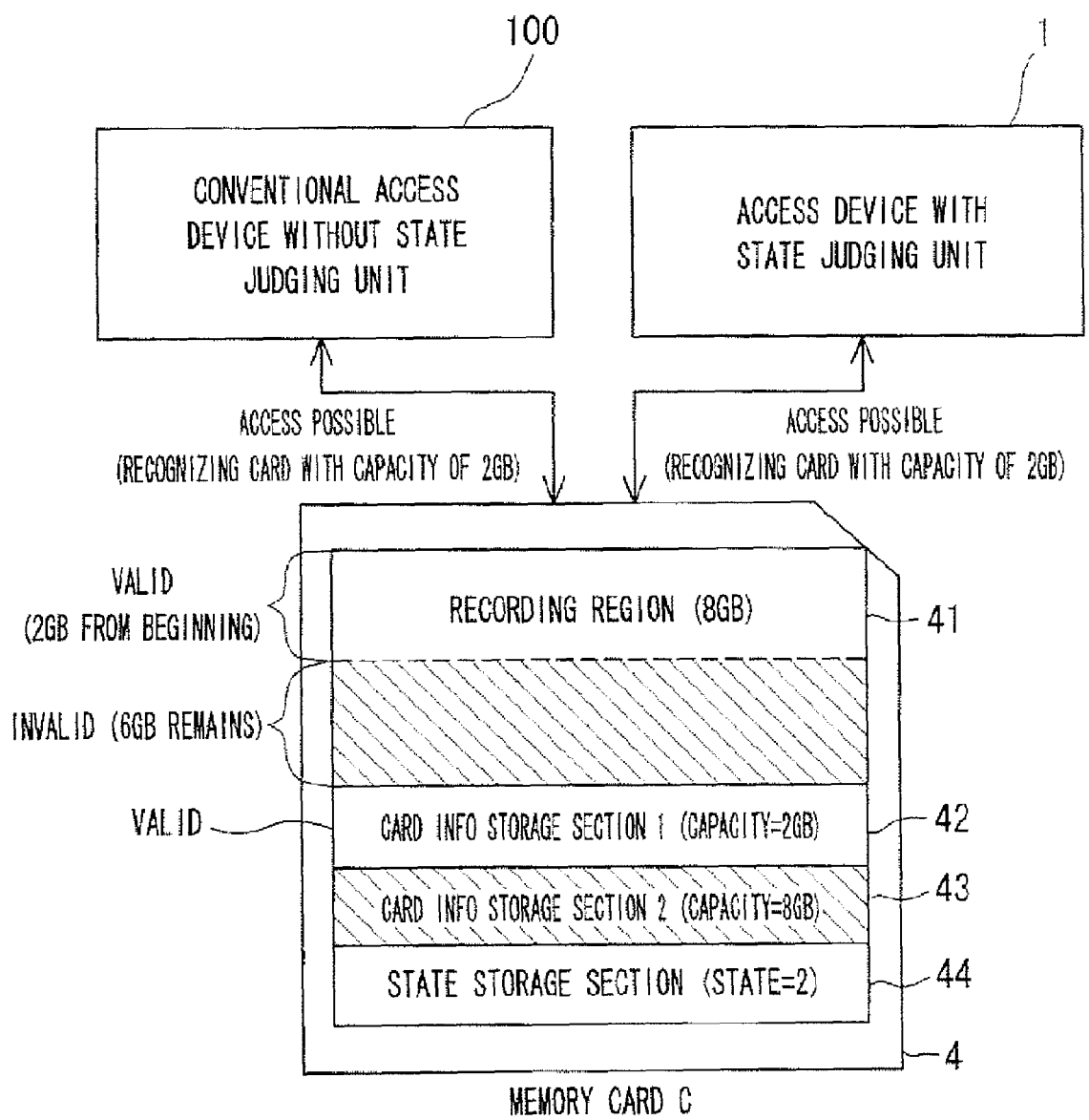
FIG. 3 is a diagram of an example of a memory card C (state "2") in embodiment 1 of the invention.
Figure 4:
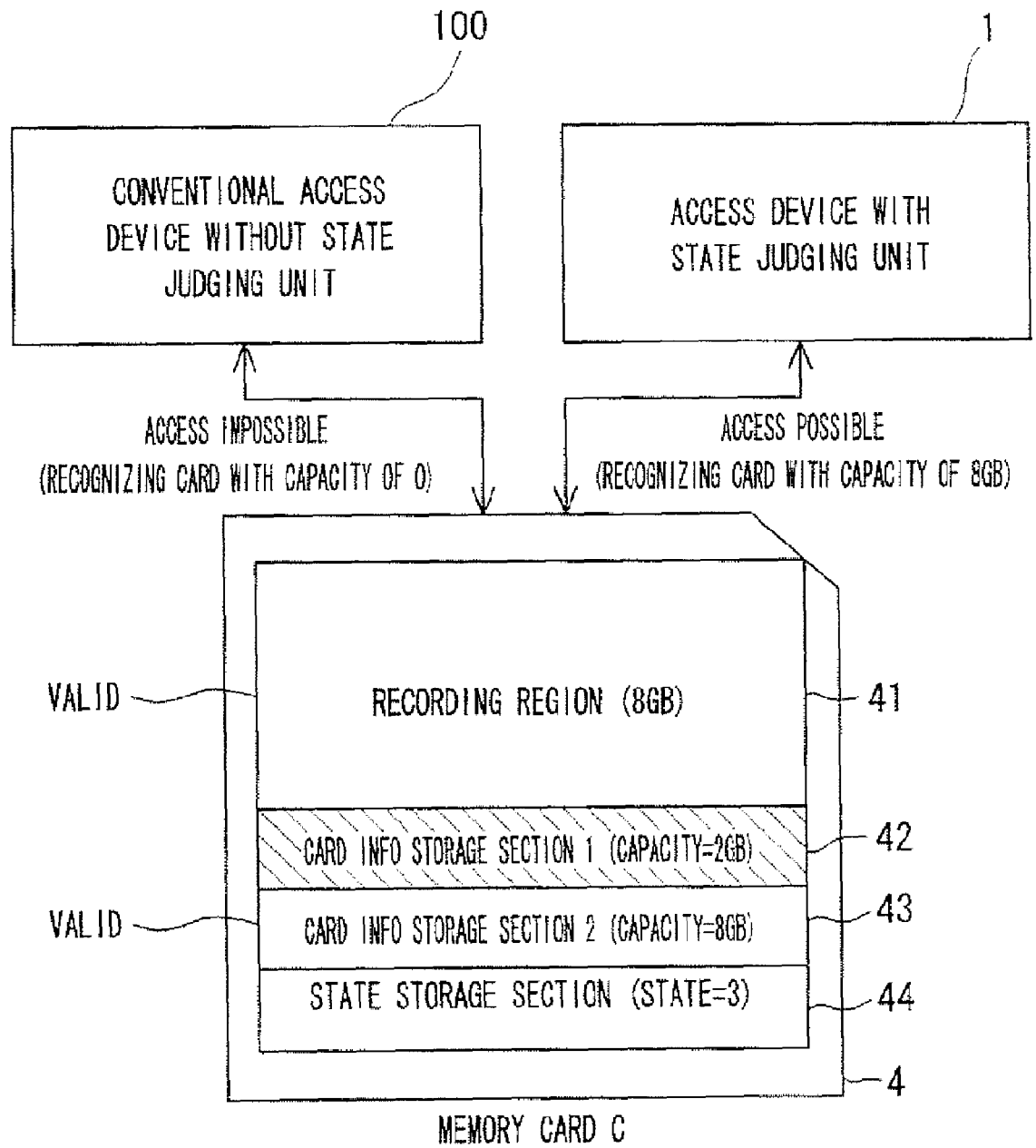
FIG. 4 is a diagram of an example of a memory card C (state "3") in embodiment 1 of the invention.

FIG. 3 and FIG. 4 are explanatory diagrams of the memory card C (4). The memory card C (4) is a next-generation memory card applicable to large capacity, and has a recording region 41 of 8 GB as large capacity region exceeding 2 GB. The memory card C (4) holds card information storage section 1 (42) expressing a capacity of 2 GB or less, and card Information storage section 2 (43) capable of expressing the size or large capacity region, each storing the value of 2 GB and 8 GB as capacity. The memory card C (4) has two states, one state operating as a conventional memory card and the other state operating as a large capacity memory card.

FIG. 3 shows the state of the memory card C (4) operating as a conventional memory card. In this case, card information storage section 1 (42) is valid, and the beginning 2 GB of the recording region 41 is accessible. On the other hand, FIG. 4 shows the state of the memory card C (4) operating as a large capacity memory card. In this case, the card information storage section 2 (43) is valid, and whole of 8 GB recording region 41 is accessible.

The memory card C (4) shown in FIG. 3 is accessible for only the beginning 2 GB of the recording region 41 whether used in the access device 1 of the embodiment or used in the conventional access device 100, so that one card can be shared by both access devices. The memory card C (4) shown in FIG. 4 is accessible for whole of 8 GB of the recording region 41 from the access device 1, but is not accessible from conventional access device 100 because it is recognized as a card of capacity 0. This is intended to prevent destruction of data stored in the memory card C (4) of large capacity due to malfunction of the conventional access device. "2" is stored as identifier showing the status (state) of FIG. 3, and "3" is stored as identifier showing the status of FIG. 4 in the state storage section 44 of the memory card C (4).

Figure 5:
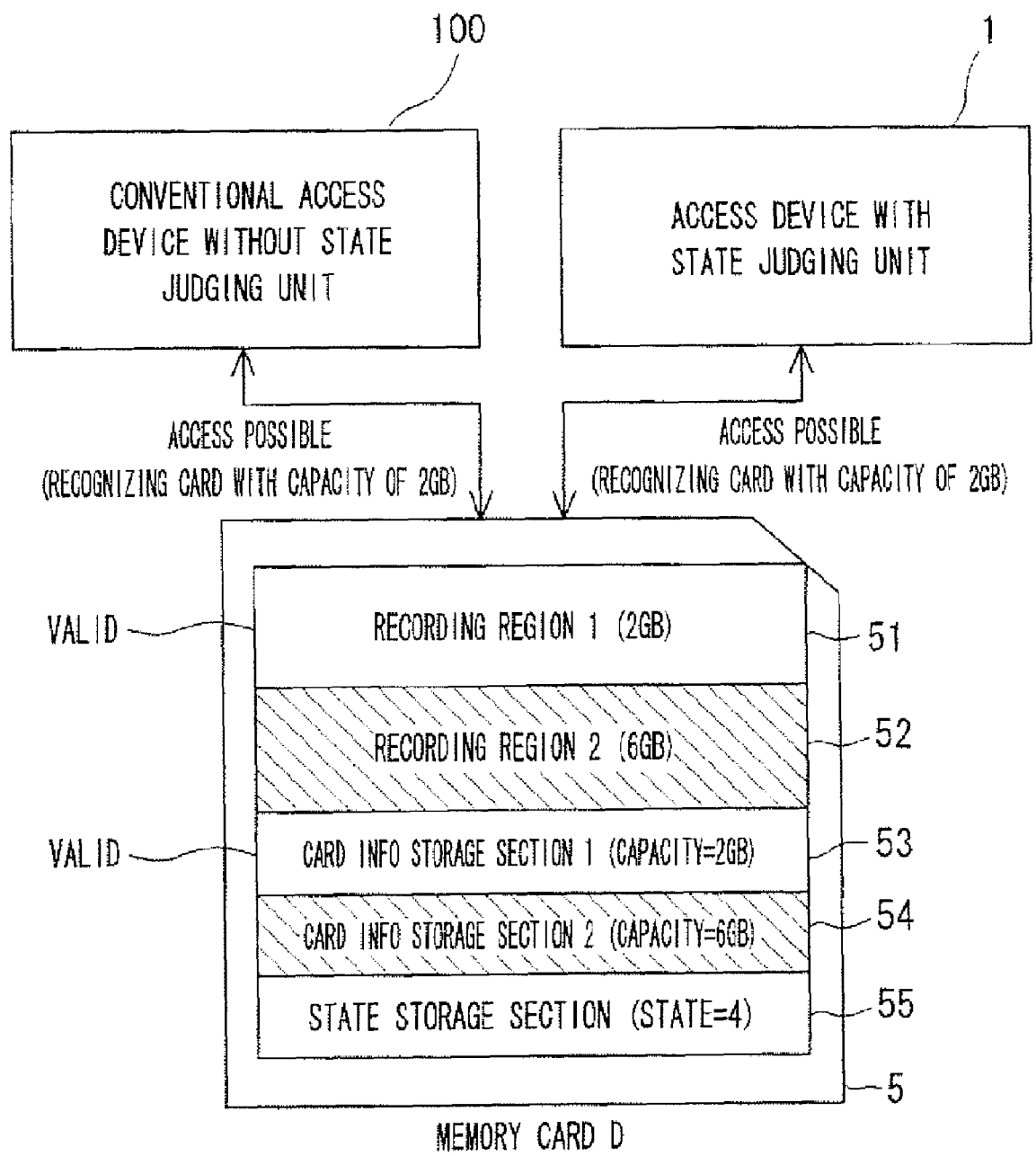
FIG. 5 is a diagram of an example of a memory card D (state "4") in embodiment 1 of the invention.
Figure 6:
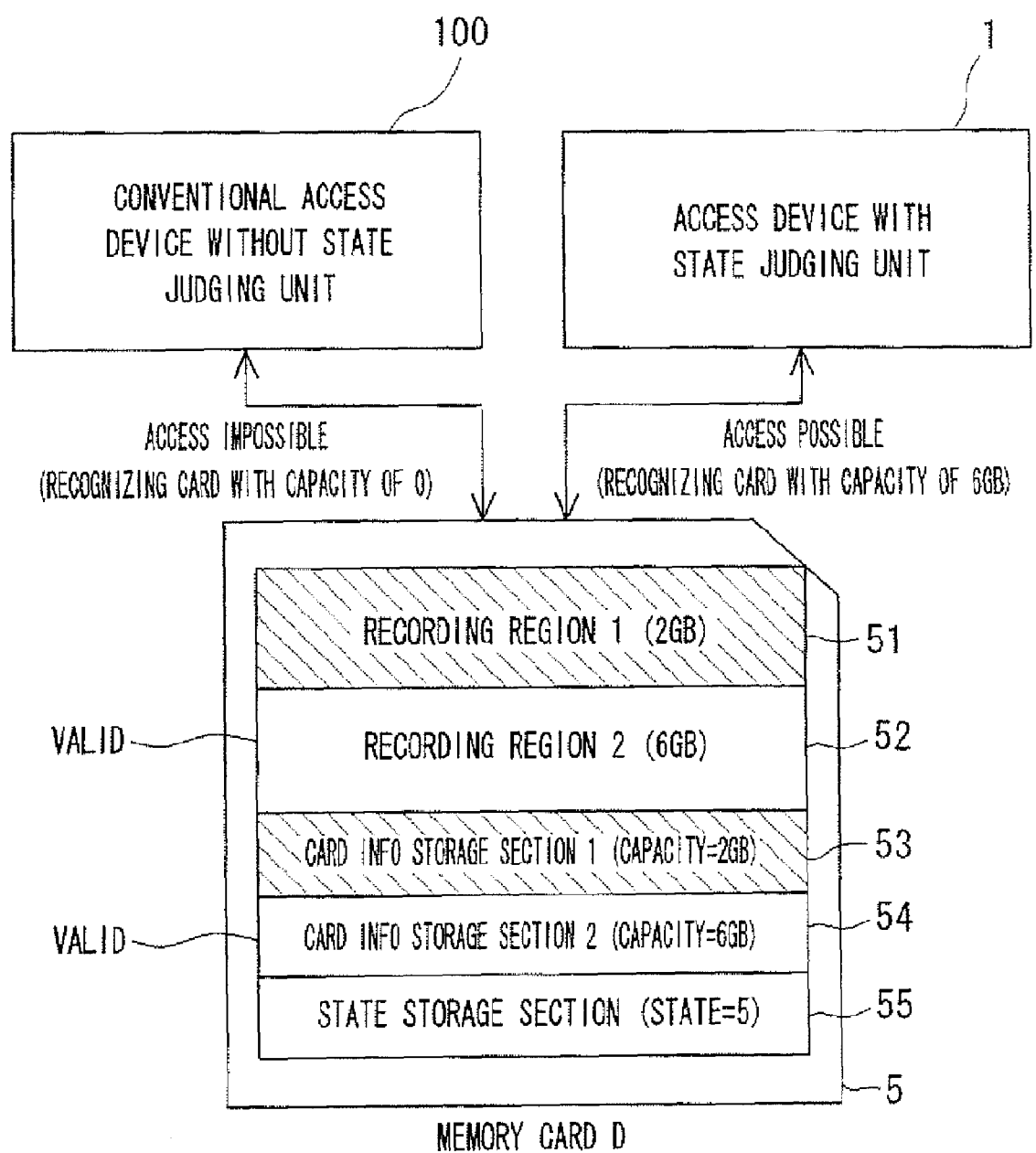
FIG. 6 is a diagram of an example of a memory card D (state "5") in embodiment 1 of the invention.

FIG. 5 and FIG. 6 are explanatory diagrams of the memory card D (5). The memory card D is a new memory card applicable to large capacity, and has a recording region 1 (51) of 2 GB, and a recording region 2 (52) of 6 GB as large capacity than 2 GB. It also holds a card information storage section 1 (53) expressing a capacity of 2 GB or less, and a card information storage section 2 (54) capable of expressing the size of large capacity region, each storing the value of 2 GB and 6 GB as capacity. The memory card D (5) has two states: one state using the recording region 1 (51) and the other state using the recording region 2 (52).

FIG. 5 shows the state using the recording region 1 (51), in which the card information storage section 1 (53) is valid and 2 GB of the recording region 1 (51) is accessible. On the other hand, FIG. 6 shows the state using the recording region 2 (52), in which the card information storage section 2 (54) is valid and 6 GB of recording region 2 (52) is accessible.

The memory card D (5) shown in FIG. 5 is accessible for 2 GB of the recording region 1 (51) whether used in the access device 1 of the embodiment or used in the conventional access device 100, so that one card can be shared by both access devices. The memory card D (5) shown in FIG. 6 is accessible for 6 GB of the recording region 2 (52) from the access device 1 of the embodiment, but is not accessible at all from the conventional access device 100 because it is recognized as a card of capacity 0. This is intended to prevent destruction of data stored in the recording region 2 (52) of the memory card D (5) due to malfunction of the conventional access device. "4" is stored as identifier showing the status in FIG. 5, and "5" is stored as identifier showing the status in FIG. 6 in the state storage section 55 of the memory card D (5).

Figure 7:
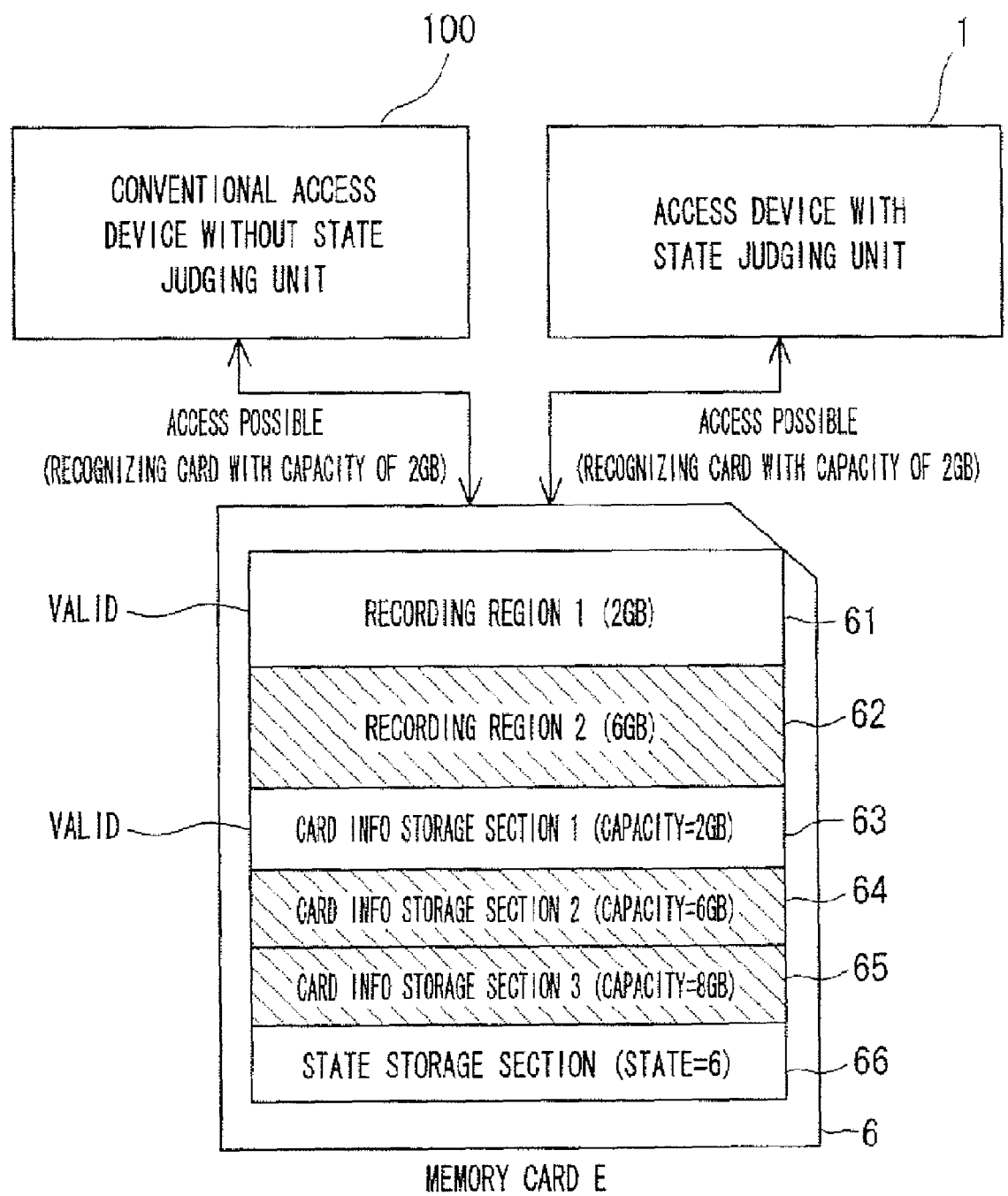
FIG. 7 is a diagram of an example of a memory card E (state "6") in embodiment 1 of the invention.
Figure 8:
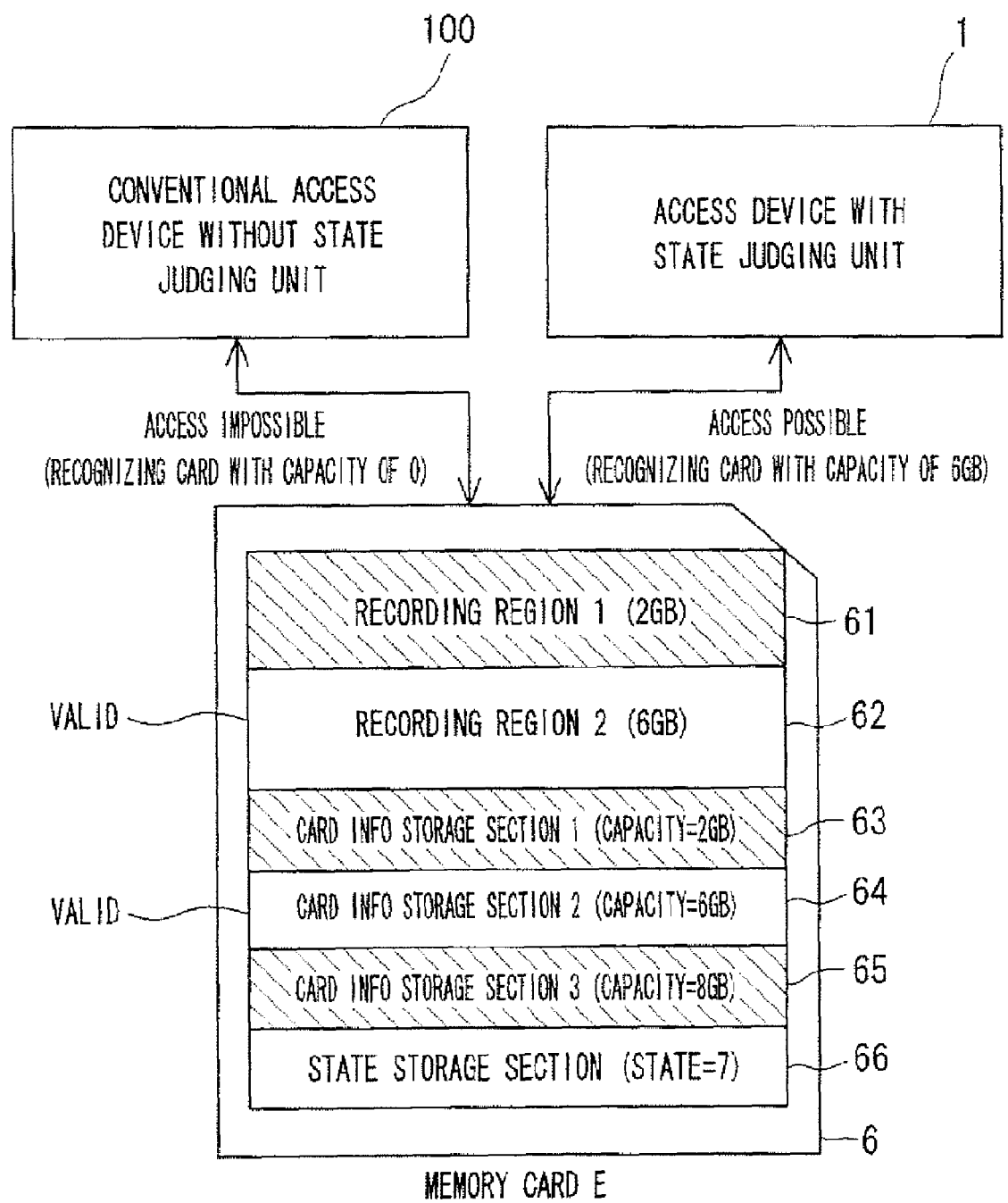
FIG. 8 is a diagram of an example of a memory card E (state "7") in embodiment 1 of the invention.
Figure 9:
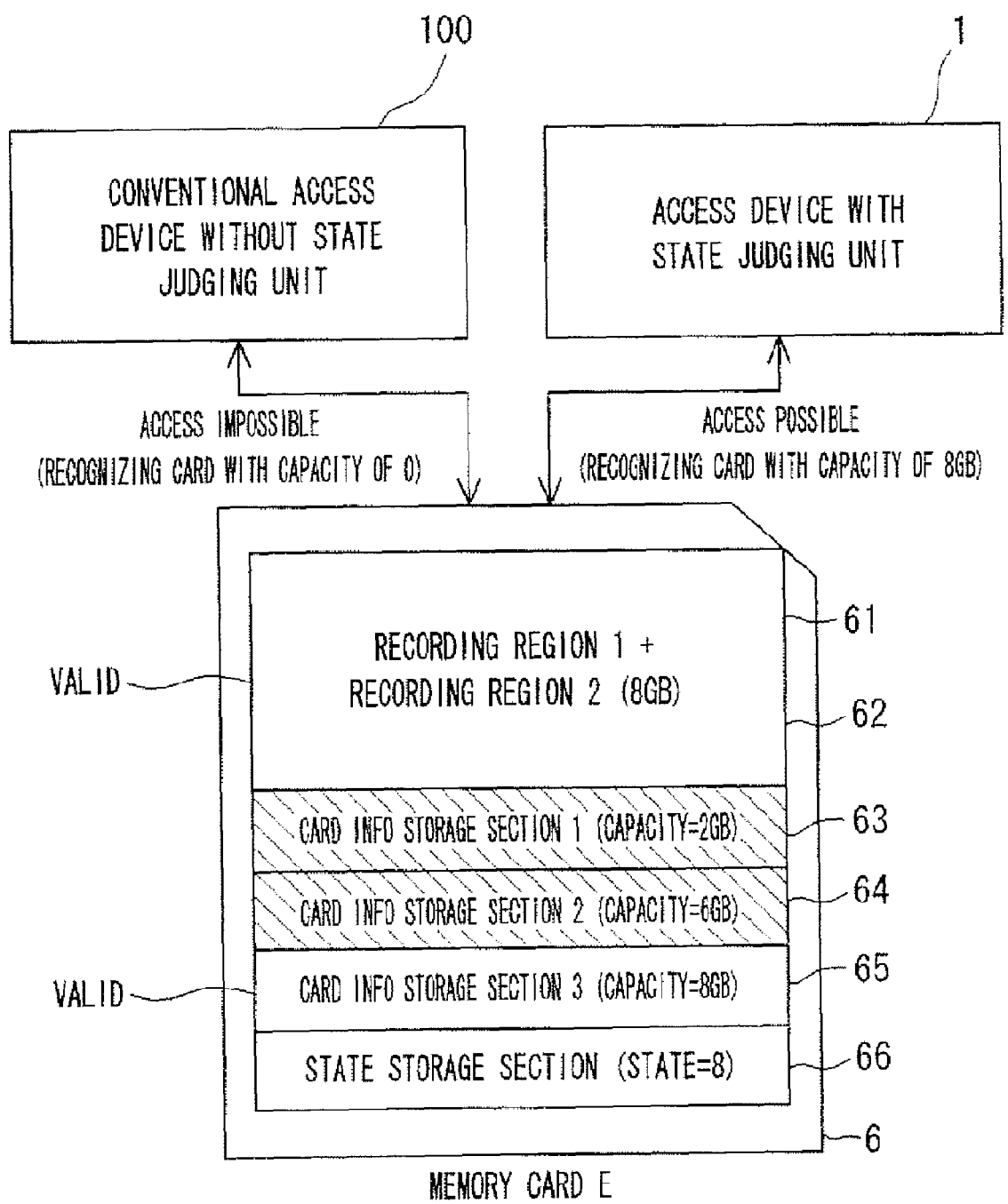
FIG. 9 is a diagram of an example of a memory card E (state "8") in embodiment 1 of the invention.

FIG. 7, FIG. 8 and FIG. 9 are explanatory diagrams of the memory card E (6). The memory card E is a new memory card applicable to large capacity, and has a recording region 1 (61) of 2 GB, and a recording region 2 (62) of 6 GB as large capacity region exceeding 2 GB. It also holds a card information storage section 1 (63) expressing a capacity of 2 GB or less, and a card information storage section 2 (64), and a card information storage section 3 (65) capable of expressing the size of large capacity region, each storing the value of 2 GB, 6 GB and 8 GB as capacity.

The memory card E (6) has three states: a state using the recording region 1 (61); a state using the recording region 2 (62); and a state using both recording region 1 (61) and recording region 2 (62) simultaneously.

FIG. 7 shows the state using the recording region 1 (61), in which the card information storage section 1 (63) is valid, and 2 GB of the recording region 1 (61) is accessible. FIG. 8 shows the state using the recording region 2 (62), in which the card information storage section 2 (64) is valid and 6 GB of the recording region 2 (62) is accessible. FIG. 9 shows the state using both the recording region 1 (61) and recording region 2 (62) simultaneously, in which the card information storage section 3 (65) is valid and a total of 8 GB region of the recording region 1 (61) and recording region 2 (62) is accessible. When used in this states, 8 GB in a region existing in a continuous address space, and all of 8 GB is managed in batch by one file system.

The memory card E (6) shown in FIG. 7 is accessible for 2 GB of the recording region 1 (61) whether used in the access device 1 of the invention or used in the conventional access device 100, so that one card can be shared by both access devices.

The memory card E (6) shown in FIG. 8 is accessible to 6 GB of recording region 2 (62) from access device 1 of the invention, but is not accessible at all from conventional access device 100 because it is recognized as card of capacity 0. This is intended to prevent destruction of data stored in the recording region 2 (62) of the memory card E (6) due to malfunction of the conventional access device.

Similarly, the memory card E (6) shown in FIG. 9 is accessible for 8 GB which is sum of recording region 1 (61) and recording region 2 (62) from the access device 1 of the invention, but is not accessible at all from conventional access device 100 because it is recognized as card of capacity 0.

As identifier showing the status in FIG. 7, "6" is stored, as identifier showing the status in FIG. 8, "7" is stored, and as identifier showing the status in FIG. 9, "8" is stored in the state storage section 66 of the memory card E (6).

Thus, there are five types of memory cards, from memory card A to memory card E. Each memory card may have one or more statuses. In the invention, in order to identify the combination of type and status of card, the state storage sections 33, 44, 55, and 66 are provided in four memory cards 3 to 6, except for conventional memory card A, and the value of state is stored therein as identifier for judging.

The state is assigned uniquely for combination of type and status of card. For example, as in the cards shown in FIG. 5 and FIG. 7, in the case having similar card status accessible for 2 GB region from the conventional access device 100, due to the different card type, different states of "4" and "6" are assigned to these cards. As a result, even if the card status is similar, the access device 1 can identify the card type individually, and appropriate process suited to the card type can be presented to the user.

Although the memory card A which is a conventional memory card does not have a state storage section, the access device 1 of the embodiment can distinguish the memory card A from other memory cards because the access device 1 cannot acquire normally the state from the memory card A.

<Access Device>

Operation of the access device 1 of the invention is described below with reference to FIG. 10 to FIG. 13.

Figure 10:
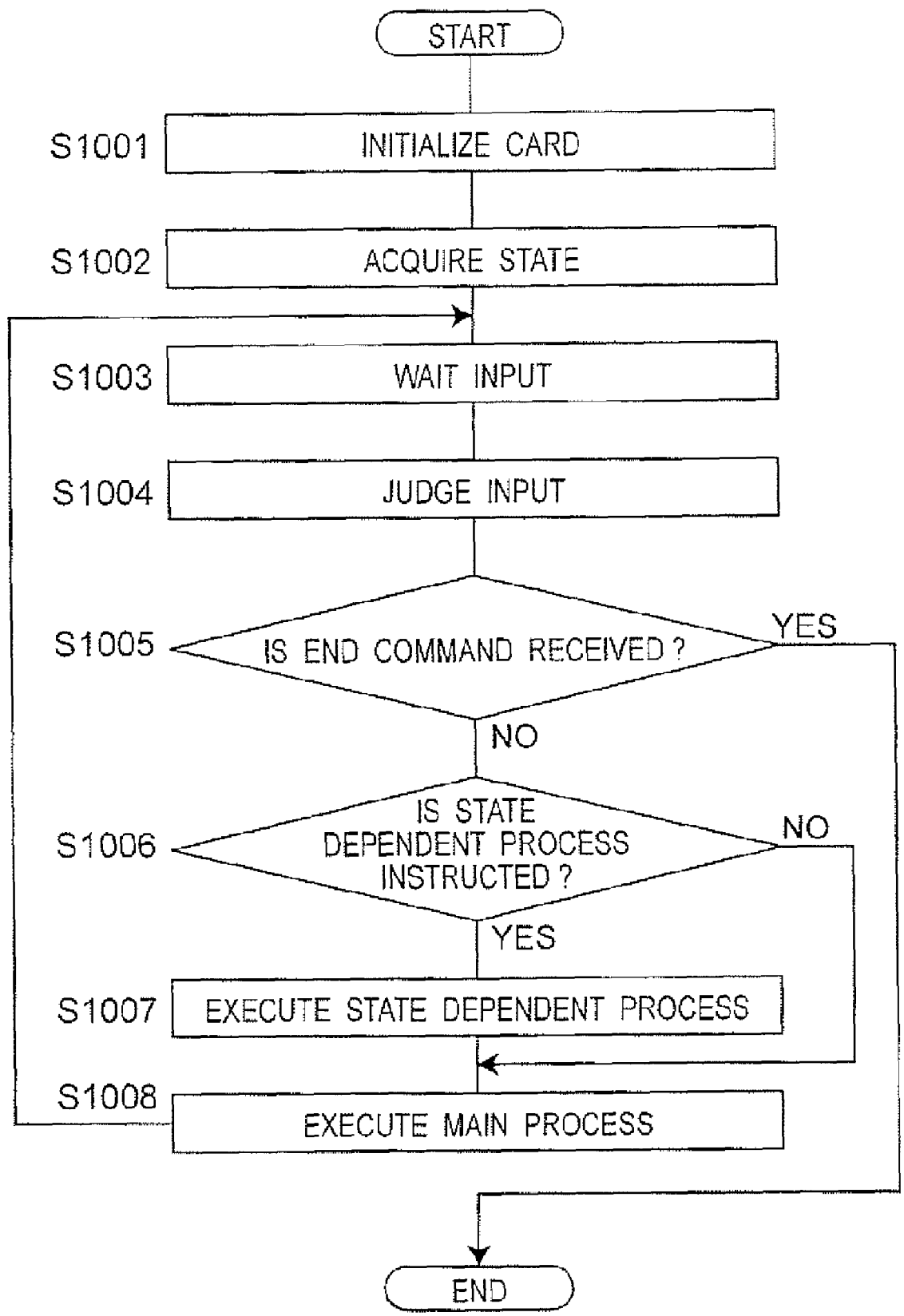
FIG. 10 is a flowchart of a basic operation flow of an access device in embodiment 1 of the invention.

Referring first to FIG. 10, a basic operation Slow in the access device 1 in the invention is explained. When the access device 1 is loaded with a memory card of any one of types A to E, an interrupt signal indicating loading of the memory card is notified to the main processing unit 15 from the card slot 11, and the card is initialized by the main processing unit 15 (S1001). Initialization of the card performs a preprocessing to render the memory card to be ready to accept read/write command from the access device 1. The initialization of the card includes issuance of an initialization command to a memory card, acquiring of data from a register in a valid card information storage sections 22, 32, . . . , acquiring of individual ID of a memory card, and acquiring of recording region size.

The state judging unit 14 of the access device 1 acquires the state stored in state storage sections 33, 44, . . . of the memory card (S1002), and judges the type and status of the memory card. Memory cards 3, 4, 5, 6 of types B, C, D, E having state storage sections notify the state information stored in the state storage sections 33, 44, . . . to the access device 1 in response to a state acquisition request from the access device 1. The access device 1 judges the type and state of the loaded memory card by the state judging unit 14 based on the state information. Since the memory card 2 of type A does not have a state storage section, even if receiving the state acquisition request from the access device 1, the memory card 2 cannot interpret the state acquisition request, and notifies an error to the access device 1. The state judging unit 14 of the access device 1, receiving an error response in response to the state acquisition request, judges that the memory card 2 of type A has been loaded.

After completion of the card initialization and state acquisition, the access device 1 finishes preparation for access to the memory card and waits for input to the operation unit 12 (S1003).

When the user's input is detected by the operation unit 12, an interrupt signal is sent to the main processing unit 15, and the main processing unit 15 judges the type of instruction input by the user (S1004). If the input instruction is an end command (Yes at S1005), other necessary ending processes such as memory escape are executed, and the access device 1 is turned off.

If the input instruction is not the end command (No at S1005), it is judged if the input instruction is a command or instructing a state dependent process which performs a process being different depending on the state (S1006).

In the case that the command is for the state dependent process (Yes at A1006), the state dependent process is executed by the state dependent processing unit 16 (S1007). The state dependent processing unit 16 refers to the state judging result of the state judging unit 14, and executes the state dependent process different in the contents of execution depending on the type or state of the memory card. That is, depending on the state of the memory card, the screen displayed by the access device 1 or output command is different.

If not for the state dependent process (No at A1006), or after end of the state dependent process, the main processing unit 15 executes a common process (main process) not depending on the type of the memory card (S1008). Upon completion of the main process, the main processing unit 15 returns again to the state for waiting for user's input.

In the basic operation flow in FIG. 10, the state acquisition (S1002) and state dependent process (S1007) are characteristic processes of the invention. The access device 1 of the invention acquires the state of the memory card after loaded with the memory card, and changes the content of process to be executed depending on the acquired state. As a result, depending on the type and status of the memory card, process of the access device is changed, and the process suited to each memory card is presented to the user.

Figure 12:
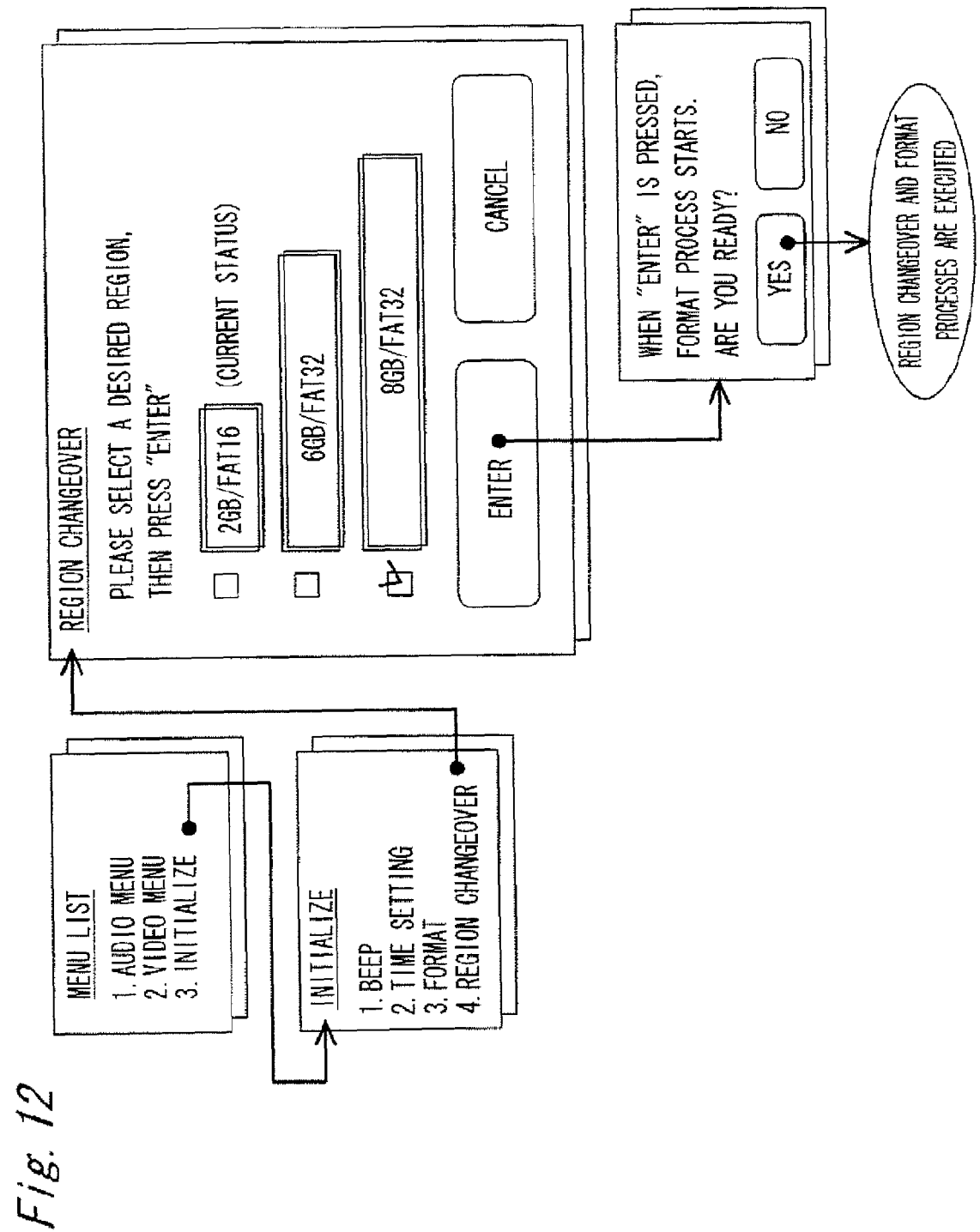
FIG. 12 is a diagram of an example of a region changeover process in embodiment 1 of the invention.

Referring next to FIG. 11 and FIG. 12, specific examples of the state dependent process by the access device 1 of the invention are described below.

FIG. 11 is a diagram of an example of a state list held in the state judging unit 14. The state judging unit 14 holds a state list as shown in FIG. 11, and refers to this list after acquiring and holding the state from the memory card, and judges the meaning of the acquired state. The state list stores: state as information for identifying uniquely the type and state of the memory card; memory card type; access region indicating the accessible region in the memory card; capacity of accessible region; number of states allowed in the card for each type; information indicating necessity of formatting when changing over the states; and type of a file system.

Referring to the list, for example, the memory card of state "5" is a memory card of D in type, having recording region 2 as accessible region, large capacity exceeding 2 GB, two states, not needing formatting when changing over the states, and using file system FAT32. Since the state judging unit 14 has a state list, the type and status of the loaded memory card are obtained on the basis of the state acquired from each memory card.

Assuming that the state judging unit 14 in FIG. 11 has the state list, a specific example of a processing for changing over the regions is explained by referring to FIG. 12. In FIG. 12, it is explained as an example that the state of the memory card 6 of type E is to be changed from "6" to "8".

For procedures in the region changeover, the user manipulates the operation unit 12 of the access device 1 to sequentially selects "3. INITIALIZE" and "4. REGION CHANGEOVER" on the menu list displayed on the display unit 13. By this operation, the menu for executing region changeover of the memory card E (6) is displayed on the display unit 13.

Process about "REGION CHANGEOVER" is a process depending on the state. Accordingly, the state dependent processing unit 16 acquires information about state of the present memory card from the state judging unit 14. The state judging unit 14 notifies information about state to the state dependent processing unit 16 on the basis of the state and state list acquired from the memory card. In the example in FIG. 12, the state judging unit 14 acquires state "6" of the memory card E (6) from the memory card, and refers to the state list in FIG. 11, and notifies the information about card type or access region to the state dependent processing unit 16. The state dependent processing unit 16 recognizes that the type of presently loaded memory card is "E" and that the state is "6" based on the information from the state judging unit 14. Since the number of states of the card is three, the state dependent processing unit 16 recognizes that this memory card can be changed over in three states.

Next, the state dependent processing unit 16 acquires information about other two states than the present state from the state judging unit 14, and displays three regions that can be changed over in the display unit 13, and urges the user to select destination of region changeover (see FIG. 12). When changing from state "6" to state "8", formatting process is necessary (see FIG. 11) Thus if execution of region changeover is selected by the user, the user is informed of occurrence of formatting process together with region changeover through the display unit 13. When the user judges that formatting process may be done and permits execution of region changeover and formatting process through the operation unit 12, region changeover and formatting process are executed.

Thus, in the example in FIG. 12, the type and status of the memory card of the access device 1 according to the invention are judged, and the number of regions that can be changed over and other information are notified to the user. Judging whether formatting is necessary or not when changing over the regions, an appropriate message is displayed to the user. As a result, when changing over the regions, necessary information and options can be presented to the user, so that the flexible region changeover process can be realized for the user.

The example in FIG. 12 shows, when displaying three regions, capacity and file system type in each region. However, accurate capacity of each region Us not stored in the state list in FIG. 11. Accordingly, the access device 1 inquires the memory card about capacity of each region, and acquires and displays them.

Thus, since the state list stores only the general information about the state, the information possibly different if same in state may be preferably acquired directly from the memory card, and presented to the user in combination with the information stored in the state list.

Figure 13:
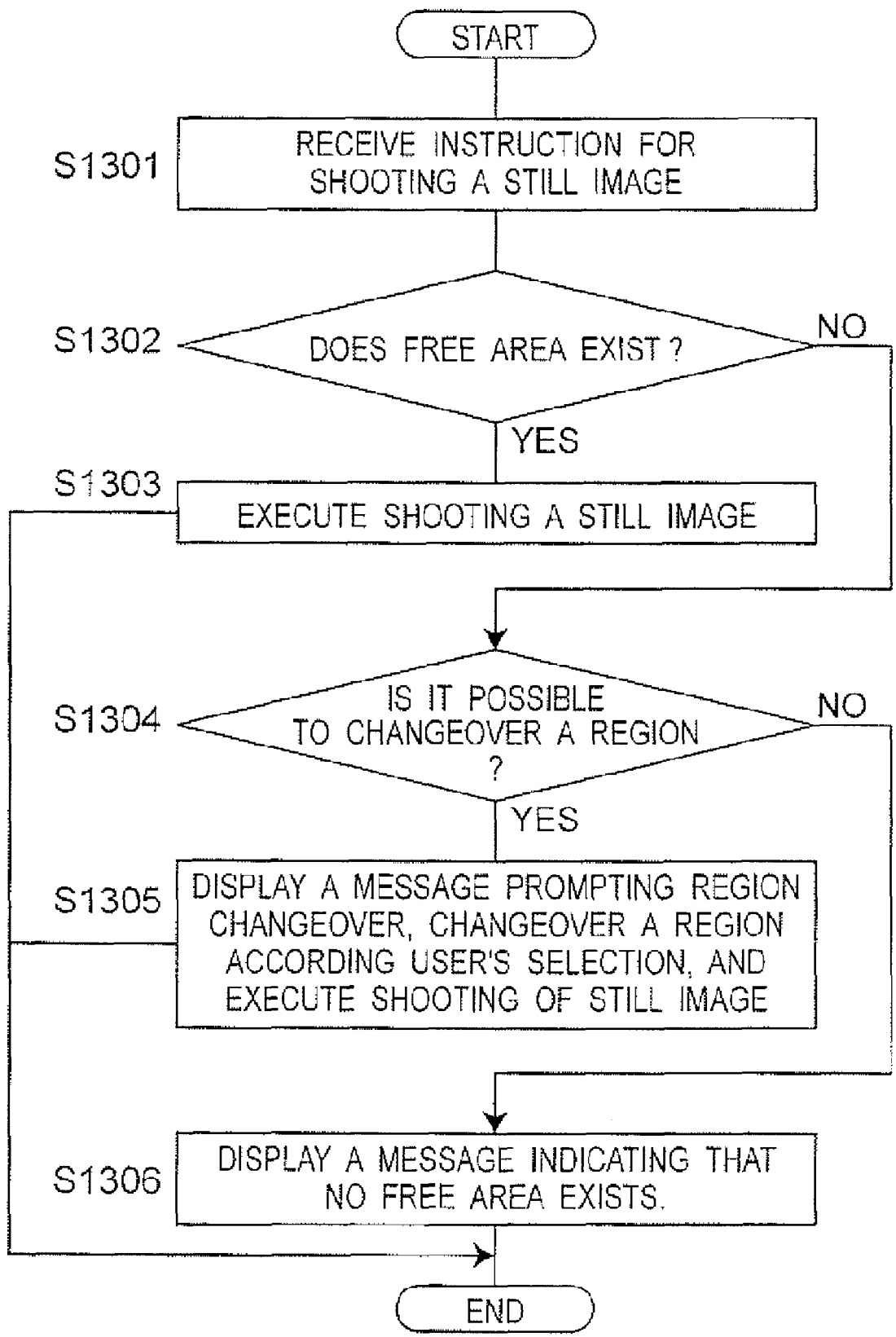
FIG. 13 is a flowchart of an example of still image shooting process in embodiment 1 of the invention.

Referring to FIG. 13, other specific example of the state dependent process by the access device 1 is explained, in which a still image is shot, and the shot still image data is recorded in a memory card.

By way of the operation unit 12 of the access device 1, the user instructs start of shooting a still image (S1301). The main processing unit 15 of the access device 1 judges if there is a free region or not in the memory card, as a preprocess of shooting of still image (S1302).

If there is a free region, the main processing unit 15 images the still image, records the still image data in the memory card, and finishes the process (S1303).

If there is no free region, the main processing unit 15 judges if the regions can be changed over or not (S1304). This judgment is made on the basis of information from the state dependent processing unit 16. Specifically, it is judged if the memory card has two recording regions to be used exclusively and can be changed over between the two regions or not. For example, referring to FIG. 11, it is judged that region changeover is possible when changing over from state "4" to state "5" in the memory card D, or when changing over from state "6" to state "7" in the memory card E.

When the region changeover is possible, the display unit 13 presents to the user that there is no vacant region in the present recording region, and that the memory card is capable of changing the regions (S1305), prompting the user to change over the recording region. When the user selects the region changeover, the recording region and state on the memory card are changed over, and a still image is imaged. When the user does not select the region changeover, there is no sufficient free region for recording the still image, and the still image shooting is cancelled and the process is terminated.

If the region changeover is not possible, there is no sufficient free region for recording a still image, and thus lack of free region is notified to the user, and the process is terminated (S1306).

Thus, in the example in FIG. 13, if the free region is insufficient when shooting a still image, the type and status of the memory card are judged, and in the case of the memory card capable of changing over the regions, the user is prompted to change over the regions, and shooting of still image is continued. Hence, even if free region is insufficient in the memory card when recording data, means for solving the lack of free region, which is region changeover, is presented to the user, and data recording can be continued, improving user's convenience. In the example shown in FIG. 13, the method of prompting the user to change over the regions while shooting still images is explained, but the regions may be changed over automatically. In particular, when the regions are changed over manually during data recording, data cannot be recorded at the moment of changeover. Thus, it is more effective to change over the regions automatically, when continuous recording, such as shooting of moving image, is necessary.

Thus, the memory card of the invention has the state storage section for storing states capable of judging the type and status of cards uniquely, and the access device can acquire the states. Further, the access device has the state judging unit and state dependent processing unit, and judges the state acquired from the memory card, and changes the content of processing depending on the state. By such combination of the memory card and access device, appropriate process suited to each memory card can be presented to the user.

In the embodiment, the state is acquired using a specific command. But a vacant bit included in a register of the card information storage section may be used for storing the state, and a command for acquiring the register value of the card information storage section may be used.

Further, presence or absence of the state storage section may be judged by making use of version number of the card described in the register of the card information storage section. For example, version number of the conventional memory card such as a memory card A is set as "1.0", and the version number of the next-generation memory card having state storage section such as a memory card B to E is set as "2.0". Hence, by referring to the version number, presence or absence of the state storage section can be judged.

Items of the state list mentioned in FIG. 11 are only examples, and all items in FIG. 11 are not always required as far as the state dependent processing unit stores required information depending on the state, and other items may be also added. As memory cards having the state storage section, four memory cards from type B to type E are explained, but it is not necessary to assign the states in all four types of memory cards, and the state may be assigned at least in one type of the memory card. Memory cards of other types having the state storage section may be also added.

Embodiment 2

Figure 14:
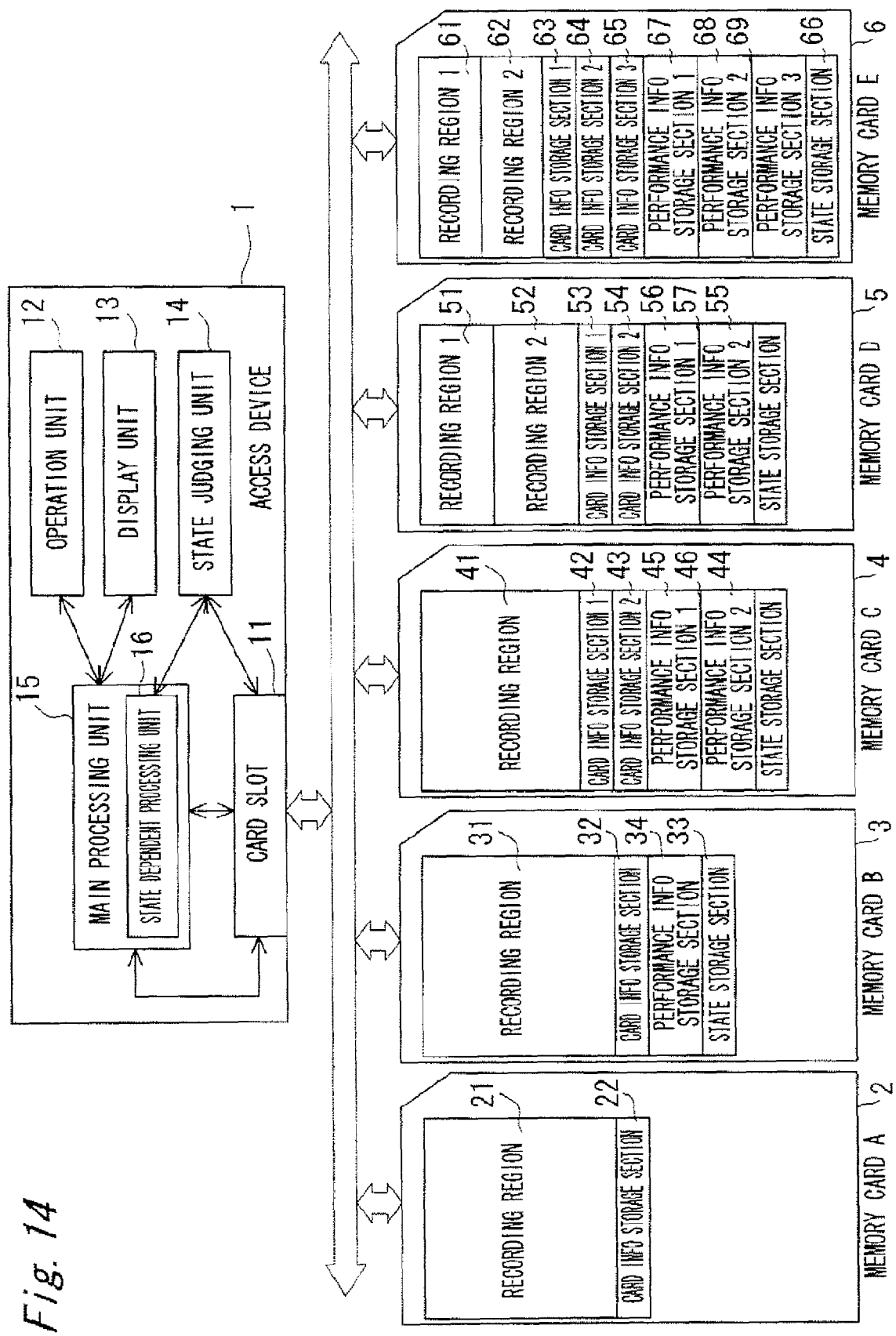
FIG. 14 is a diagram showing implementation of a memory card and access device in embodiment 2 of the invention.

FIG. 14 is a block diagram of the memory card and access device in embodiment 2 of the invention. In FIG. 14, what differs from FIG. 1 lies in that the memory card B to memory card E further Include performance information storage sections 34, 45, 46, . . . provided corresponding to the card information storage sections. The memory cards of the embodiment hold information for specifying the valid performance information storage sections in the management information region.

The memory card having plural states is changed in the accessible region length when the state is changed over, and may be simultaneously changed in access performance such as read/write performance. In the embodiment, the memory card having the state storage section is further provided with a performance information storage section, and a performance information storage section which is valid is changed over simultaneously with changeover of states, and the performance information in the present state is changed.

FIG. 15 is a diagram of example of performance information stored in the performance information storage sections 34, 45, 46, . . . . In the example in FIG. 15, contents of processing include three types, read, write and erase, and the input clock is available in three types, 12.5 MHz, 25 MHz, 50 MHz, and the performance values in each combination are described in a table format. For example, the access performance with 25 MHz clock input to the memory card and data written in 16 KB units is known to be 6 MB/sec in standard in sequential access and 0.7 MB/sec in random access, by referring to the second row in Table 2-B.

Thus, referring to the performance information stored in the performance information storage sections 34, . . . , the access device 1 can recognize the access performance when accessing the memory card in each condition. However, this access performance may not always be the same in all states when the memory card has plural states, and may be different in each state. In the embodiment, accordingly, simultaneously with changeover of states, the valid performance information storage sections are changed over, and the performance information in current state is changed. Thus, by changing over the performance information storage sections, the access device can acquire the access performance suited to each state, and the contents of process can be changed depending on the state.

FIG. 16 shows an example about change of contents of processing. FIG. 16 (a) is a setting screen of recording mode in the memory card E of state "6", and FIG. 16(b) is a setting screen of recording mode in the memory card E of state "8".

The recording mode setting screen shown in FIG. 16 is a screen displayed for selection by the user of recording image quality on shooting a moving image. Options of recording image quality include "economy", "normal", "fine" and "super-fine". The recording bit rate of moving image data becomes higher sequentially and moving image data can be recorded at higher image quality in more latter recording mode.

In the embodiment, it is assumed that data can be recorded at higher speed in state "8" than in state "6" in the memory card E. In this case, in FIG. 16 (a) corresponding to state "6" of the memory card A, since data can be recorded only at low speed, the display is provided so that only low recording bit rates such as "economy" and "normal" can be selected, and "fine" and "super-fine" cannot be selected. On the other hand, in FIG. 16 (b) corresponding to state "8" of the memory card E, since data can be recorded at high speed, as well as at low speed, the display is provided so that all recording modes can be selected. Thus, since the access device is arranged to acquire toe access performance of each state, the processing contents can be changed in the access device depending on the state.

Figure 17:
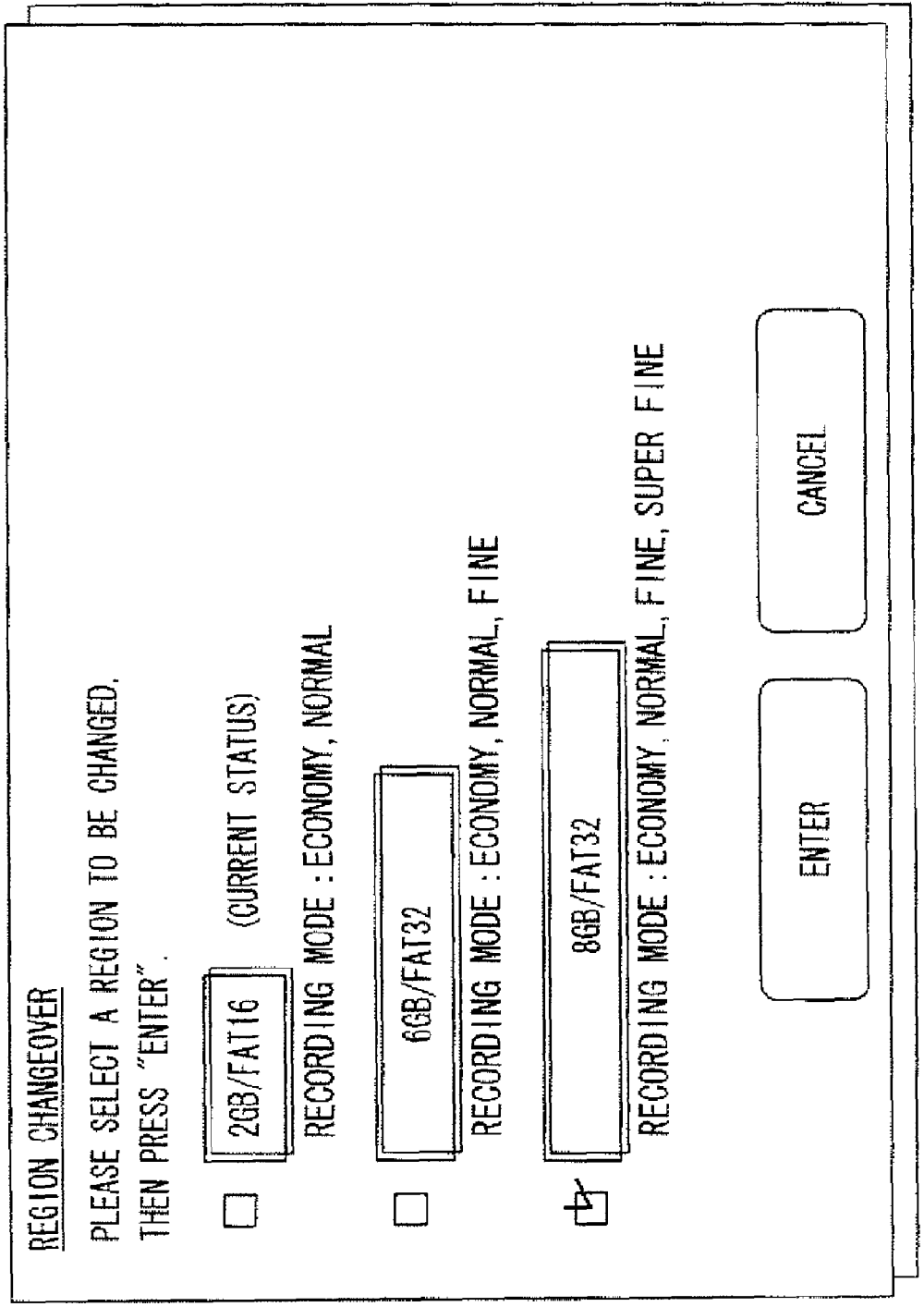
FIG. 17 is a diagram of an example of a region changeover process in embodiment 2 of the invention.

In FIG. 16, an example of the access device acquiring the performance information corresponding to the state one by one is explained, but regardless of the state, the access device may acquire the performance information in all states in batch. Referring to FIG. 17, an example of acquiring the performance information in batch is explained.

FIG. 17 is a region changeover screen displayed for changing over the regions same as in FIG. 12. What the screen in FIG. 17 differs from the screen in FIG. 12 lies in that the recordable mode permitted in each region is displayed. The access device 1, when displaying the region changeover screen in FIG. 17, acquires the performance information from all performance information storage sections of the memory card. In batch acquisition of performance information, all performance information may be acquired in a list form by one command, or may be acquired by executing plural times a command for acquiring one piece of performance information. On the basis of the acquired performance information, the recordable mode supportable in each state is determined, and the name of the determined recording mode is displayed in the region changeover screen. Thus, by displaying the name of an available recordable mode before the region changeover, the user can preliminarily recognize a recordable mode which is to be available after the region changeover, so that it can be used as one index for region selection.

Thus, the memory card of the invention has the performance information storage section for storing performance information of the memory card corresponding to the state, in addition to the state storage section for storing the state capable of identifying the type and status of the card uniquely, also changes over the valid performance information storage section simultaneously with state changeover, and changes the performance information in current state. By thus changing over the performance information storage section, the access device can acquire the access performance depending on the state, so that contents of processing can be changed depending the state.

The performance information shown in FIG. 15 is only an example, and other method of expression may be employed as far as capable of expressing access performance of the memory card varying depending on the state, such as data transfer amount per unit time and processing time necessary for transferring unit data amount. Instead of storing the value directly expressing The access performance, a flag showing a specific access performance may be stored. For example, assuming input clock of 25 MHz and access unit of 16 KB, a card with write performance value of 2 MB/sec or more may be defined as "class 1", and a card with 4 MB/sec or more may be defined as "class 2", and a flag identifying "class 1" or "class 2" may be stored in the performance information storage section. Further, when the quantity of information stored in the performance information storage sections 34, . . . is small, a part of a region of the card information storage sections 32, . . . may be used for a region for storing the performance information.

Figure 18:
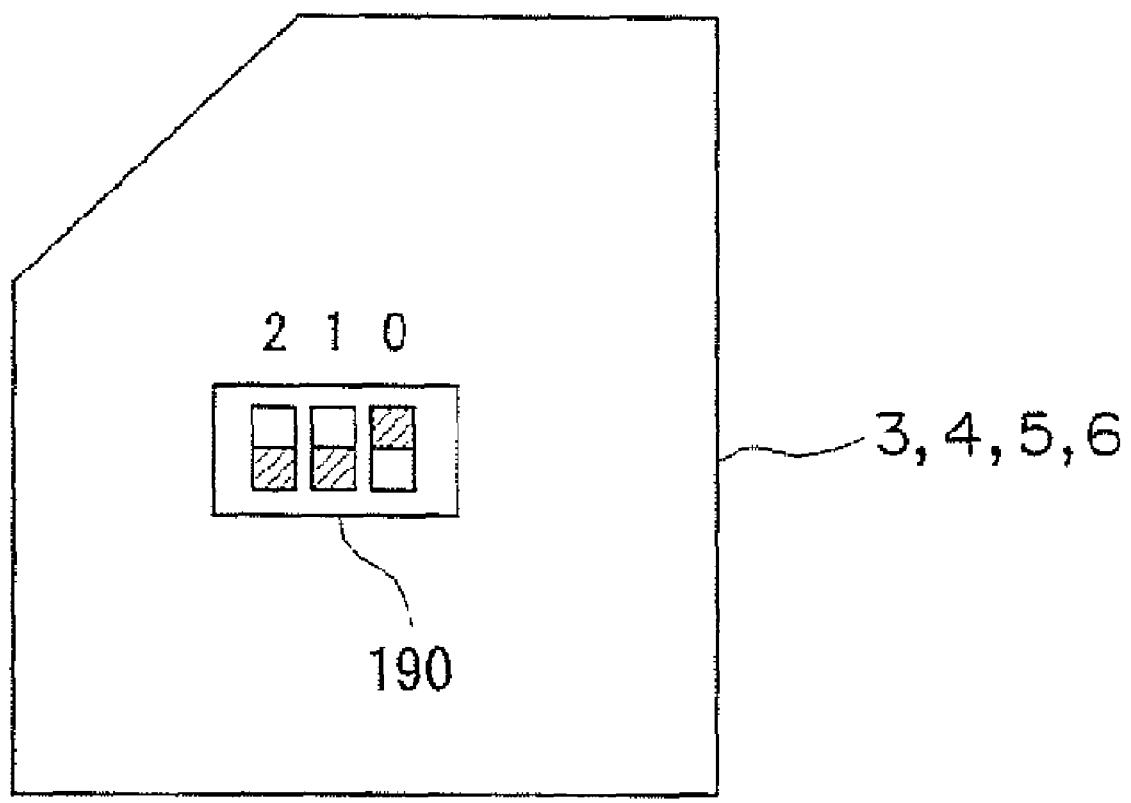
FIG. 18 is a diagram of a memory card having a physical switch.

As explained in the foregoing embodiments, the information indicating the type and status of the memory card is stored in the state storage section as specified region in the memory card, and is supplied to the access device 1 from the state storage section. However the state storage section may be composed of a physical switch. That is, the information indicating the type and status of the memory card may be changed over by a switch provided physically on the memory card. The memory card, depending on the status of the physical switch, sends the state information to the access device, and recognizes the valid card information storage section. The physical switch is not particularly specified as far as it car change over plural states. The physical switch may include dial switch, slide switch, or DIP switch. For example, a DIP switch 190 as shown in FIG. 18 may be provided outside of the memory card to change over the value of state.

Figure 19:
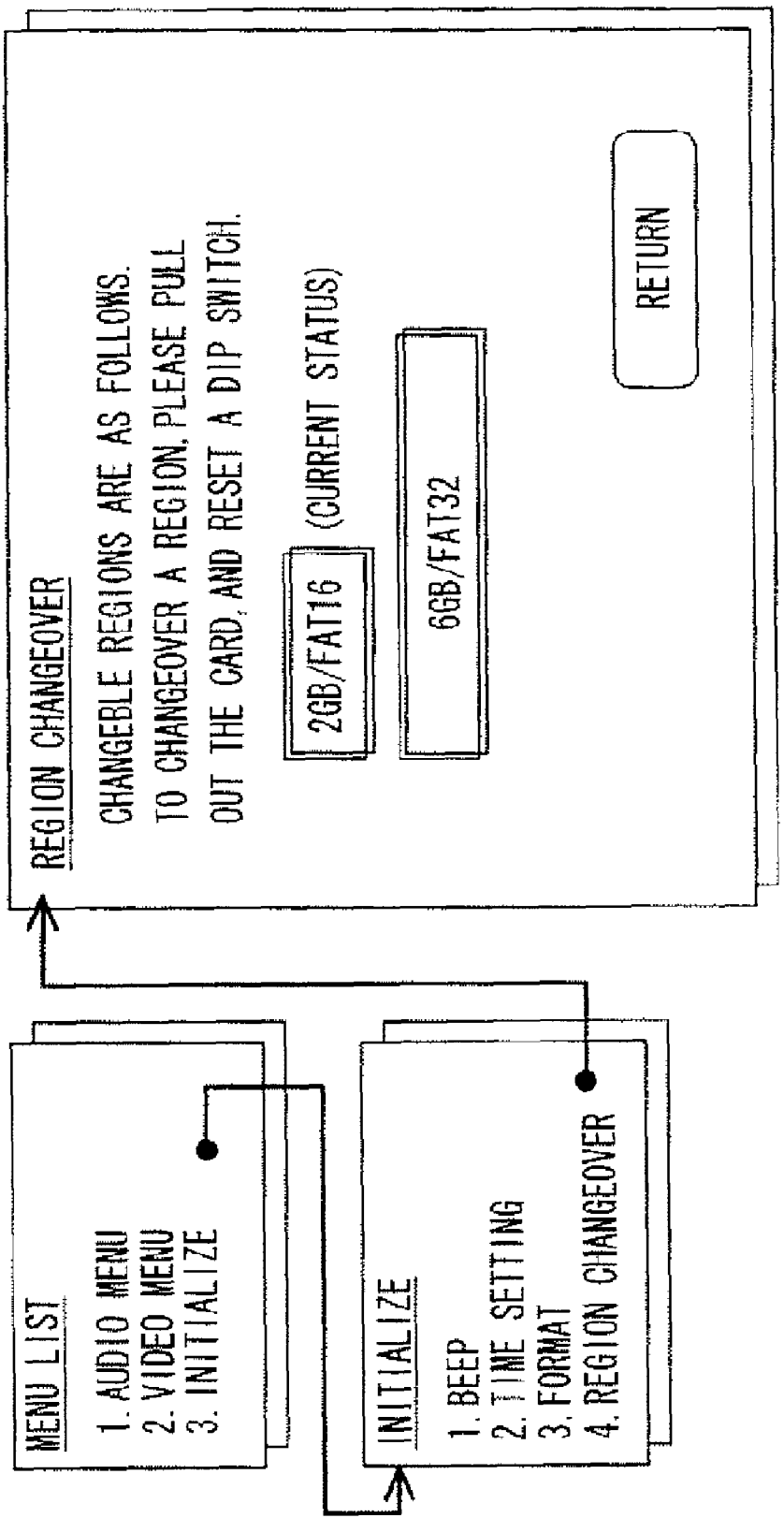
FIG. 19 is a diagram of an example of a region changeover process when states of memory card can be changed over by a physical switch.

FIG. 19 is a diagram of display example of "region changeover screen" about the memory card of type D for changing over the states by a physical switch. When changing over the states by the physical switch, it is needed to inform the user that the user should change over setting manually. The memory card D recognizes the state on the basis of setting of the physical switch, rewrites information for specifying a card information storage section which is valid, and transmits the state information based on the setting of the physical switch to the access device 1. The access device 1 recognizes the state of the memory card based on the state information transmitted based on the setting of physical switch from the memory card. If the memory card is of type C or type E, a new format may be created by region changeover. In such a case, mismatching may occur between setting of the physical switch and setting in the memory card. Thus, if mismatching occurs between setting of the physical switch and setting information) in the memory card, the access device 1 may preferably inform the user of that fact and rewrite the setting in the memory card so as to conform to the setting of the physical switch.

INDUSTRIAL APPLICABILITY

The memory card and access device of the invention can provide the user with appropriate processing depending on the memory card, by storing the identifier capable of judging the type and status of the memory card uniquely in the memory card, and allowing the access device to acquire the identifier to change the processing contents depending on the type and status of the memory card. Hence, the invention may be widely applied in technical fields including a recording medium for storing digital data such as music contents and moving image contents, digital still camera, portable cellular terminals, memory card movie player, audio player, PC, PDA, etc.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2004-127813, filed on Apr. 23, 2004, which is expressly incorporated herein by reference in its entirety.

The invention claimed is:

1. An information recording medium in which data is managed with a file system and is readable and writeable by an access device, comprising:
   at least one recording region that records the data and that is managed by an independent file system;
   a state storage that stores a state, the state being assigned to each combination of type and status of the information recording medium, and enabling a unique identification of a current type and a current status of the information recording medium from possible combinations of the information recording medium; and
   at least one medium information storage that is provided for each state of the information recording medium, and that stores physical characteristics about at least a capacity of the at least one recording region,
   wherein the state identifies a combination of the current type and the current status of the information recording medium,
   wherein the current status of the information recording medium specifies types of access devices enabled to access the information recording medium and specifies at least one portion of the information recording medium accessible by the access device, and
   wherein the state represents one of at least three distinct combinations of the current type and the current status of the information recording medium.

2. The information recording medium of claim 1, wherein a number of the at least one recording region and a number of the at least one medium information storage is respectively one,
   wherein access to an entire region of the at least one recording region is permitted when accessed from an access device capable of acquiring and interpreting the state stored in the state storage, and
   access to the at least one recording region is prohibited when accessed from an access device incapable of acquiring and interpreting the state stored in the state storage.

3. The information recording medium of claim 1, wherein a number of the at least one recording region is one,
   wherein the at least one medium information storage includes a first medium information storage and a second medium information storage,
   wherein the information recording medium is in either a first state or a second state,
   wherein, when the information recording medium is in the first state, the first medium information storage is made available to be referred to from the access device and and access is permitted to the at least one recording region depending on physical characteristics stored in the first medium information storage, and
   wherein, when the information recording medium is in the second state, the second medium information storage is made available to be referred to from the access device and access is permitted to the at least one recording region depending on physical characteristics stored in the second medium information storage.

4. The information recording medium of claim 1, wherein the at least one recording region includes a first recording region and a second recording region,
   wherein the at least one medium information storage includes a first medium information storage and a second medium information storage,
   wherein the information recording medium is in either a first state or a second state,
   wherein, when the information recording medium is in the first state, the first medium information storage is made available to be referred to from the access device and access is permitted to the first recording region depending on physical characteristics stored in the first medium information storage, and
   wherein, when the information recording medium is in the second state, the second medium information storage is made available to be referred to from the access device, and access is permitted to the second recording region depending on physical characteristics stored in the second medium information storage.

5. The information recording medium of claim 1, wherein the at least one recording region includes a first recording region and a second recording region,
   wherein the at least one medium information storage includes a first, a second, and a third medium information storage,
   wherein the state storage is enabled to store three states,
   wherein, when the information recording medium is in a first state, the first medium information storage is made available to be referred to from the access device, and access is permitted to the first recording region depending on physical characteristics stored in the first medium information storage,
   wherein, when the information recording medium is in a second state, the second medium information storage is made available to be referred to from the access device and access is permitted to the second recording region depending on physical characteristics stored in the second medium information storage, and
   wherein, when the information recording medium is in a third state, a third medium information storage is made available to be referred to from the access device and access is permitted to the first and the second recording regions depending on physical characteristics stored in the third medium information storage.

6. The information recording medium of claim 1, further comprising:
   at least one performance information storage that stores performance information indicating access performance relating to a transfer rate of the information recording medium, the at least one performance information storage provided for each state stored in the state storage.

7. The information recording medium of claim 6, wherein only the performance information corresponding to the current state of the information recording medium, from the performance information stored in the at least one performance information storage is made available to be referred to by the access device.

8. The information recording medium of claim 6, wherein all of the performance information stored in the at least one performance information storage is made available to be referred to by the access device, regardless of the current state of the information recording medium.

9. The information recording medium of claim 1, wherein the state storage comprises a physical switch.

10. An access device for accessing an information recording medium, comprising:
a medium slot that is loaded with the information recording medium;
an operator that receives an instruction from a user;
a display that displays a list of a status of the information recording medium or the access device and of a process specified by the user;
a state judger that acquires, from the information recording medium, a state which enables uniquely identifying a current type and a current status of the information recording medium from possible combinations stored in the information recording medium, and judges the current type and the current status of the information recording medium based on of the acquired state;
a state dependent processor that refers to a judging result of the state judger, and executes the process depending on the state of the information recording medium; and
a main processor that executes a specified process including a data reading and a writing process on the information recording medium, according to input from the operator,
wherein the state identifies a combination of the current type and the current status of the information recording medium,
wherein the current status of the information recording medium specifies types of access devices enabled to access the information recording medium and specifies at least one portion of the information recording medium accessible by the access device, and
wherein the state represents one of at least three distinct combinations of the current type and the current status of the information recording medium.

11. The access device of claim 10, wherein the state judger includes a state list including type of the information recording medium, an access region of the information recording medium, a capacity of the information recording medium, a possible number of states of the information recording medium, information relating to a necessity of formatting upon a change-over of the states, and a type of a file system provided in each state.

12. The access device of claim 10, wherein performance information indicating access information of the information recording medium relating to a transfer rate is acquired in addition to the state from the information recording medium.

13. The access device of claim 12, wherein only the performance information corresponding to the state of the information recording medium is acquired from the information recording medium.

14. The access device of claim 12, wherein all of the performance information is acquired from the information recording medium regardless of the state of the information recording medium.

15. A processing method of an information recording medium, comprising:
initializing the information recording medium when the information recording medium is loaded in an access device;
acquiring a state which enables uniquely identifying a type and a status of the information recording medium, from the information recording medium;
judging whether or not a user request from the access device is a request dependent on the state; and
executing a process to the information recording medium depending on the state of the information recording medium with reference to the acquired state, when the user request is judged to be dependent on the state based on the judging result,
wherein the state identifies a combination of a current type and a current status of the information recording medium;
wherein the current status of the information recording medium specifies types of access devices enabled to access the information recording medium and specifies at least one portion of the information recording medium accessible by the access device, and
wherein the state represents one of at least three distinct combinations of the current type and the current status of the information recording medium.

16. The processing method of claim 15, further comprising:
acquiring performance information indicating the access information relating to a transfer rate of the information recording medium, from the information recording medium.

17. An information recording system comprising an information recording medium and an access device, wherein
the information recording medium comprises:
at least one recording region that records data and is managed by an independent file system;
a state storage that stores state, the state being assigned to each combination of type and status of the information recording medium, and enabling uniquely identifying of a current type and a current status of the information recording medium from possible combinations for the information recording medium; and
at least one medium information storage that is provided for as many as states provided by the information recording medium, and stores physical characteristics about at least a capacity of the at least one recording region, and
wherein the access device comprises:
an operator that receives an instruction from a user;
a state judger that acquires, from the information recording medium, a state which enables uniquely identifying a current type and a current status of the information recording medium from possible combinations in the information recording medium, and judges the current type and the current status of the information recording medium on the basis of the acquired state;
a state dependent processor that refers to a judging result of the state judger, and executes a process depending on the state of the information recording medium; and
a main processor that executes the process including a data reading and a writing process on the information recording medium, according to input from the operator,
wherein the state identifies a combination of the current type and the current status of the information recording medium,
wherein the current status of the information recording medium specifies types of access devices enabled to access the information recording medium and specifies at least one portion of the information recording medium accessible by the access device, and
wherein the state represents one of at least three distinct combinations of the current type and the current status of the information recording medium.

* * * * *